(12) United States Patent
Zhou et al.

(10) Patent No.: US 12,020,093 B2
(45) Date of Patent: Jun. 25, 2024

(54) HANDHELD PRINTER, PRINTING METHOD, INFORMATION PROCESSING METHOD AND PRINTING DEVICE

(71) Applicant: ZHUHAI BENTSAI ELECTRONICS CO., LTD., Guangdong (CN)

(72) Inventors: Dan Zhou, Guangdong (CN); Yang Li, Guangdong (CN); Gaoping Yang, Guangdong (CN)

(73) Assignee: Zhuhai Bentsai Electronics Co., Ltd., Guangdong (CN)

( * ) Notice: Subject to any disclaimer, the term of this patent is extended or adjusted under 35 U.S.C. 154(b) by 219 days.

(21) Appl. No.: 17/637,216

(22) PCT Filed: Jan. 26, 2021

(86) PCT No.: PCT/CN2021/073847
§ 371 (c)(1),
(2) Date: Feb. 22, 2022

(87) PCT Pub. No.: WO2021/169712
PCT Pub. Date: Sep. 2, 2021

(65) Prior Publication Data
US 2022/0300775 A1 Sep. 22, 2022

(30) Foreign Application Priority Data

Feb. 27, 2020 (CN) .......................... 202010123183.1
Feb. 27, 2020 (CN) .......................... 202010126377.7
(Continued)

(51) Int. Cl.
*B41J 3/36* (2006.01)
*B41J 2/045* (2006.01)
(Continued)

(52) U.S. Cl.
CPC ........ *G06K 15/005* (2013.01); *B41J 2/04505* (2013.01); *B41J 2/04586* (2013.01);
(Continued)

(58) Field of Classification Search
CPC .......................................................... B41J 3/36
See application file for complete search history.

(56) References Cited

U.S. PATENT DOCUMENTS 5,634,730 A   6/1997   Bobry
6,227,661 B1  5/2001   Hayakawa
(Continued)

FOREIGN PATENT DOCUMENTS

CN    1695945 A      11/2005
CN    101673177 A    3/2010
(Continued)

OTHER PUBLICATIONS

International Search Report (with English translation) and Written Opinion for PCT/CN2021/073487, filed Jan. 26, 2021.
(Continued)

*Primary Examiner* — Julian D Huffman
(74) *Attorney, Agent, or Firm* — Fleit Intellectual Property Law; Paul D. Blanco; Gary S. Winer

(57) ABSTRACT

In the field of printing equipment, a handheld printer, a printing method, an information processing method and a printing device is provided. The problem that an existing printer is limited in operation and printing is solved. The handheld printer includes a printer body, a nozzle protection cover, and a handle. The nozzle protection cover and the handle are provided at two opposite ends of the printer body. The printer body includes a printing panel, and the printing panel is located on the inner side of the nozzle protection cover. The printing panel is provided with at least two nozzles, the at least two nozzles are sequentially arranged at
(Continued)

intervals in the first preset direction and the second preset direction, the first preset direction is in the vertical direction, and an included angle is formed between the second preset direction and the first preset direction.

4 Claims, 13 Drawing Sheets

(30) Foreign Application Priority Data

Feb. 27, 2020 (CN) .......................... 202010126378.1
Feb. 27, 2020 (CN) .......................... 202010126379.6

(51) Int. Cl.
  *G06K 15/00* (2006.01)
  *G06K 15/02* (2006.01)
(52) U.S. Cl.
  CPC ............ *B41J 3/36* (2013.01); *G06K 15/1822* (2013.01); *G06K 15/1898* (2013.01)

(56) References Cited

U.S. PATENT DOCUMENTS

| | | | |
|---|---|---|---|
| 7,784,425 | B2 | 8/2010 | Matsumoto |
| 8,860,680 | B2 | 10/2014 | Miyazaki |
| 2002/0070988 | A1 | 6/2002 | Desormeaux |
| 2005/0002722 | A1 | 1/2005 | Goodwin |
| 2007/0076082 | A1 | 4/2007 | Cook |
| 2007/0223982 | A1 | 9/2007 | Miller et al. |
| 2008/0068346 | A1 | 3/2008 | Naganawa |
| 2008/0144053 | A1 | 6/2008 | Gudan et al. |
| 2012/0001969 | A1 | 1/2012 | Puri |
| 2018/0264859 | A1 | 9/2018 | Kawamata |
| 2020/0079112 | A1* | 3/2020 | Osanai ................... B41J 2/1753 |
| 2020/0171831 | A1 | 6/2020 | Lee et al. |
| 2022/0300775 | A1 | 9/2022 | Zhou et al. |

FOREIGN PATENT DOCUMENTS

| | | | |
|---|---|---|---|
| CN | 101927618 | A | 12/2010 |
| CN | 101983130 | A | 3/2011 |
| CN | 202573301 | U | 12/2012 |
| CN | 102848737 | A | 1/2013 |
| CN | 103838530 | A | 8/2014 |
| CN | 104417062 | A | 3/2015 |
| CN | 105538911 | A | 5/2016 |
| CN | 106354369 | A | 1/2017 |
| CN | 206067199 | U | 4/2017 |
| CN | 207207474 | U | 4/2018 |
| CN | 207388643 | U | 5/2018 |
| CN | 108116049 | A | 6/2018 |
| CN | 105856843 | A | 8/2018 |
| CN | 109263280 | A | 1/2019 |
| CN | 109532246 | A | 3/2019 |
| CN | 208946890 | U | 6/2019 |
| CN | 209111760 | U | 7/2019 |
| CN | 110116557 | A | 8/2019 |
| CN | 110126479 | A | 8/2019 |
| CN | 110435302 | A | 11/2019 |
| CN | 110515566 | A | 11/2019 |
| CN | 209580859 | U | 11/2019 |
| CN | 209580861 | U | 11/2019 |
| CN | 209580884 | U | 11/2019 |
| CN | 110561921 | A | 12/2019 |
| CN | 209813456 | U | 12/2019 |
| CN | 110688074 | A | 1/2020 |
| CN | 111300999 | A | 6/2020 |
| CN | 111301022 | A | 6/2020 |
| CN | 111367410 | A | 7/2020 |
| CN | 111367480 | A | 7/2020 |
| DE | 10160076 | C1 * | 6/2003 ............... B41J 3/36 |
| EP | 3272540 | A1 | 1/2010 |
| EP | 2259928 | B1 | 12/2010 |
| EP | 3020555 | A1 | 5/2016 |
| EP | 3121014 | B1 | 3/2018 |
| JP | 2015018341 | A | 1/2015 |
| JP | 2019038135 | A | 3/2019 |
| WO | 2008/132977 | A1 | 11/2008 |
| WO | 2019/050087 | | 3/2019 |
| WO | 2021/169712 | A1 | 9/2021 |

OTHER PUBLICATIONS

For Chinese Patent Application No. 202010123183, published Jun. 19, 2020: First Office Action, dated Oct. 27, 2020 (with English translation) First search (English translation) Second search (English translation) Notification to Grant Patent Right, dated Nov. 27, 2020.
For Chinese Patent Application No. 202010126379, published Jun. 19, 2020: First Office Action, dated Mar. 1, 2021 (with English translation) Second Office Action, dated Aug. 25, 2021 (with English translation) First search (English translation) Supplementary search (English translation).
Decision to Grant a Patent for EPO application No. 21 760 925.4; dated Nov. 22, 2023.
Notification to Grant Patent Right for Invention for CN application No. 202180004194.0; English translation of Notification to Grant Patent Right for Invention CN application No. 202180004194.0; dated Nov. 30, 2023.
OA1 of CN family application No. 202180004194.0; English translation of first Office Action for CN application No. 202180004194. 0; dated Nov. 24, 2022.
OA1 of KR family application No. 10-2022-7010182; English translation of first office action for KR application No. 10-2022-7010182; dated Dec. 23, 2023.
OA1 of IN family application No. OA1 of priority application of CN 202010126377.7; English translation of first office action of priority application No. 202010126377.7; dated Jan. 9, 2023.
OA1 of priority application of CN 2020101263781; English translation of first office action of CN priority application of 202010126378. 1; dated Feb. 1, 2023.
OA2 of CN family application of No. 202180004194.0; English translation of Second office action of CN application No. 202180004194. 0; dated Jul. 30, 2023.
English translation of Written Opinion of The International Searching Authority of WO2021169712; dated May 11, 2021.
OA1 of EPO family application No. 21 76 0925.4; dated Oct. 19, 2022.
Supplemental Search report of CN application No. 202180004194. 0; filed Jan. 26, 2021.
OA1 of IN family application No. 20224700337; dated Sep. 30, 2022; with English translation.
First search of CN priority application No. 2020101263781; filed Feb. 27, 2020.
European search report for EPO application No. 21 76 0925.4; dated Oct. 19, 2022.
First search of priority application CN202010126377.7; filed Feb. 27, 2020.
Supplementary search of CN family application No. 202180004194. 0; filed Jan. 26, 2021.

* cited by examiner

HANDHELD PRINTER, PRINTING METHOD, INFORMATION PROCESSING METHOD AND PRINTING DEVICE

CROSS-REFERENCE TO RELATED APPLICATIONS

The present disclosure claims priority to Chinese Patent Application No. 202010123183.1, entitled "Portable Printer" and filed with the China National Intellectual Property Administration on Feb. 27, 2020, the entire contents of which are incorporated herein by reference.

The present disclosure claims priority of Chinese Patent Application No. 202010126377.7, entitled "Information Processing Method and Device, Handheld Printer and Readable Storage Medium" and filed with the China National Intellectual Property Administration on Feb. 27, 2020, the entire contents of which are incorporated herein by reference.

The present disclosure claims priority to Chinese Patent Application No. 202010126378.1, entitled "Printing Method and Device, Storage Medium and Handheld Printer" and filed with the China National Intellectual Property Administration on Feb. 27, 2020, the entire contents of which are incorporated herein by reference.

The present disclosure claims priority of Chinese Patent Application No. 202010126379.6, entitled "Printing Method and Device, Handheld Printer and Storage Medium" and filed with the China National Intellectual Property Administration on Feb. 27, 2020, the entire contents of which are incorporated herein by reference.

TECHNICAL FIELD

The present disclosure relates to the field of printing devices, and in particular to a handheld printer, a printing method, an information processing method, and a printing device.

BACKGROUND ART

Traditional inkjet printers are bulky and inconvenient to move. Industrial inkjet printing nozzles have complex combinations and are difficult to assemble and debug, and printing information is transmitted through a computer, which is inconvenient to operate. At present, most handheld printers on the market are single-nozzle and dual-nozzle printers, and when used for printing texts, two-dimensional codes, graphics, etc., they are highly limited in height and thus cannot meet the demands.

In addition, handheld printers are widely used due to their unique portability and flexibility. Unlike a conventional printer, the handheld printer only needs to be held by a user and then the user slides over a specified area, and then a preset printing content is left in the specified area. For example, if the user holds the handheld printer to slide it on a wall, a preset printing content will be left on the wall. However, since the current handheld printers all adopt a single-nozzle setting, printed images are too small in breadth (area). If a user wants to print a large-area image, the user has to print it repeatedly, which is inefficient and time-consuming.

On the other hand, the existing handheld printers directly display the results of the user's manual editing when the user inputs relevant content and performs manual editing. Because an editing interface is small and not sensitive to movement, there may be overlaps in the displayed results. In this case, the user needs to make further adjustments manually. For the user, the operation is very inconvenient and the experience is poor.

In addition, according to a printing method of the existing handheld printer, every time a printing button is pressed, the printer works for printing once, which is not suitable for mass printing tasks. This method will increase the workload of a user and reduce work efficiency. Moreover, it is difficult to ensure the reliability of product quality in mass printing tasks because the user is tired. In addition, it is also easy to cause premature failure of vulnerable parts (e.g., the printing button) in the handheld printer.

SUMMARY

An objective of the present disclosure includes, for example, providing a handheld printer, a printing method, an information processing method, and a printing device, which can overcome the problems of operation and printing limitations of the existing printer.

The objective of the present disclosure can be implemented as follows.

The present disclosure provides a handheld printer, including:
a printer body, a protective nozzle cover and a handle, the protective nozzle cover and the handle being arranged at two opposite ends of the printer body;
the printer body including a printing panel, the printing panel being located at an inner side of the protective nozzle cover; the printing panel being provided with at least two nozzles, the at least two nozzles being sequentially arranged along a first preset direction and a second preset direction and spaced apart, the first preset direction referring to a vertical direction, an included angle being formed between the second preset direction and the first preset direction;
the printer body including a top cover, a left side cover, a right side cover, and an electronic control module; two sides of the printing panel being respectively connected with the left side cover and the right side cover to form an upward opening; the top cover being movably connected with the right side cover so that the electronic control module is in an on-or-off state when the opening is opened or closed;
the printer body further including a touch screen; the touch screen being fixed on the left side cover, the electronic control module being fixed on an inner side of the left side cover, the touch screen and the electronic control module being electrically connected;
the printer body further including an upper cover, an ink cartridge support module, and ink cartridges; the upper cover being arranged at the opening, and two opposite sides of the upper cover being connected to the left side cover and the right side cover, respectively; the ink cartridge support module being arranged below the upper cover, the ink cartridges being installed between the upper cover and the ink cartridge support module; and
the ink cartridge support module including a plurality of ink cartridge locking plates; the plurality of ink cartridge locking plates being arranged sequentially in a direction from the left side cover to the right side cover and spaced apart, a locking groove for installing the ink cartridge being formed between every two adjacent ink cartridge locking plates, all the locking grooves being arranged sequentially along the first preset direction and the second preset direction and spaced apart, the upper cover being connected to tops of the plurality of ink cartridge locking plates.

The beneficial effects of the handheld printer provided in the present disclosure include, for example:

in the handheld printer, since the nozzles and the handle are arranged at the two opposite ends of the printer body, the handheld printer is in compact structure, has a small size, and light weight and is easy to carry; during operation, the set position of the handle makes it easier to operate and print and the quality of printed products can be improved; the stepped setting of the nozzles helps to increase the height of printed texts, two-dimensional codes and graphics, thereby improving the printing efficiency and achieving strong adaptability.

BRIEF DESCRIPTION OF DRAWINGS

For clear description of the technical solutions in the embodiments of the present disclosure, drawings to be used in the embodiments will be briefly introduced below. It should be understood that the following drawings merely illustrate some embodiments of the present disclosure and therefore should not be construed as limiting the scope. Those ordinarily skilled in the art also could obtain other related drawings based on these drawings without doing creative labor.

Figure 1:
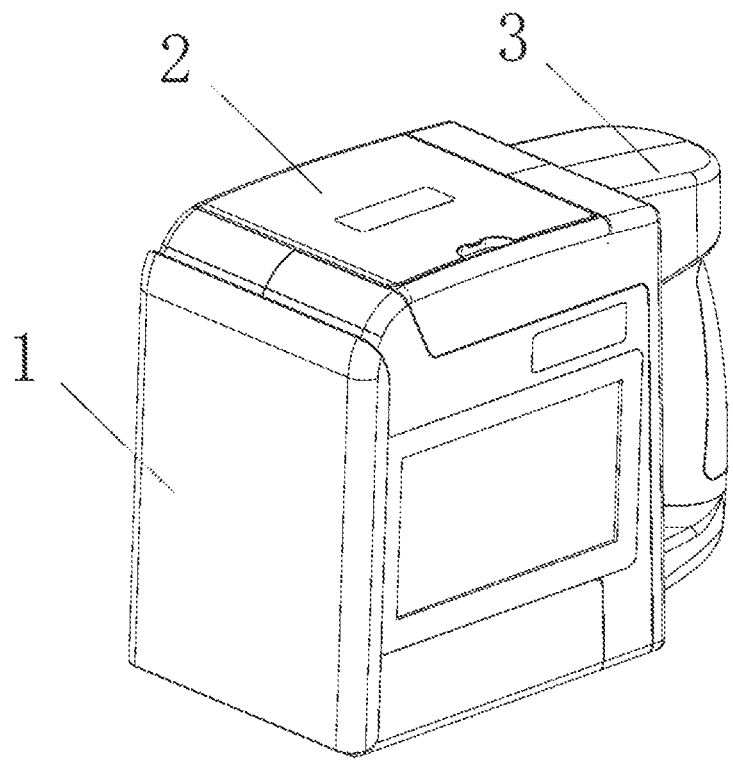
FIG. 1 is a schematic diagram of an isometric view of an assembly drawing of a handheld printer according to an embodiment of the present disclosure.

Reference numerals: 10—handheld printer; 2—printer body; 1—protective nozzle cover; 3—handle; 11—strong magnet; 12—positioning column; 13—locking groove; 14—protective nozzle cotton; 15—cover plate; 21—top cover; 27—printing panel; 23—left side cover; 28—right side cover; 26—electronic control module; 24—touch screen; 22—upper cover; 25—ink cartridge support module; 210—battery cover; 29—bottom plate; 25c—battery; 25d—battery hood; 25a—first ink cartridge locking plate; 25b—second ink cartridge locking plate; 25e—ink cartridge; 25g—positioning bead; 25h—third ink cartridge locking plate; 27h—second bearing; 27a—sheet metal; 27b—first bearing; 27c—Hall chip board; 27d—rubber ring; 27e— main roller; 27f—magnet; 27g—front panel; 27i—steel shaft; 32—left plate; 33—right plate; 31—printing button;

200—first printing device; 201—obtaining module; 202—determining module; 203—first printing module;

3200—information processing device; 3201—processing module; 3202—feedback module;

113—inkjet printing part; 131—first nozzle; 132—second nozzle; 133—third nozzle; 134—fourth nozzle; 320—second printing device; 321—command obtaining module; 322—interval delay determining module; 323—second printing module.

DETAILED DESCRIPTION OF EMBODIMENTS

For clear description of the objectives, technical solutions, and advantages of embodiments of the present disclosure, the technical solutions in the embodiments of the present disclosure will be described clearly and completely below with reference to the accompanying drawings in the embodiments of the present disclosure. It is apparent that the described embodiments are some of, not all the embodiments of the present disclosure. The components in embodiments of the present disclosure, typically described and illustrated herein in the drawings, may be arranged and designed in a variety of different configurations.

Accordingly, the following detailed description of the embodiments of the present disclosure provided in the drawings is not intended to limit the scope of the present disclosure claimed, but merely to explain the selected embodiments of the present disclosure. All other embodiments obtained by a person of ordinary skill in the art based on the embodiments of the present disclosure without creative efforts shall fall within the protection scope of the present disclosure.

It should be noted that similar reference numerals and letters denote similar items in the accompanying drawings, and therefore, once a certain item is defined in one drawing, it is not necessary to further define and explain it in the following accompanying drawings.

In the description of the present disclosure, it should be noted that the orientation or positional relationship indicated by the terms such as "upper", "lower", "inner", "outer", if present, are based on the orientation or positional relationship shown in the drawings, or refers to the orientation or positional relationship usually adopted when the product of the present disclosure is used, and is only for the convenience of describing the present disclosure and simplifying the description, rather than indicating or implying that the device or element referred to must be in a specific orientation, be constructed or operated in a specific orientation; therefore, it cannot be understood as a limitation to the present disclosure.

In addition, the terms "first", "second" and the like, if any, are only used to distinguish the description and should not be construed as indicating or implicating relative importance.

It should be noted that the features in the embodiments of the present disclosure may be combined with each other in the case of no conflict.

As mentioned in the background art section of the present disclosure, the traditional inkjet printers are bulky and inconvenient to move. Industrial inkjet printing nozzles have complex combinations and are difficult to assemble and debug, and printing information is transmitted through a computer, which is inconvenient to operate. In order to solve this technical problem, a handheld printer is provided in the prior art. However, in the existing handheld printer, a printing operation is implemented by a side portion of the printer body, and an operator generally operates the printer body from the top or bottom of the printer body. Since the operation side for printing and the operation side of the operator form an angle, it is inconvenient for the operator to apply a force and operate the printer during a printing construction process. In addition, since the printers are mostly single-nozzle and dual-nozzle printers, the printing heights of texts, two-dimensional codes and graphics are limited. A handheld printer 10 provided by this embodiment (the handheld printer 10 is especially marked in FIGS. 10 and 29) can solve the above technical problems.

Specifically, the handheld printer of this embodiment will be described in detail below with reference to FIGS. 1 to 9.

Figure 3:
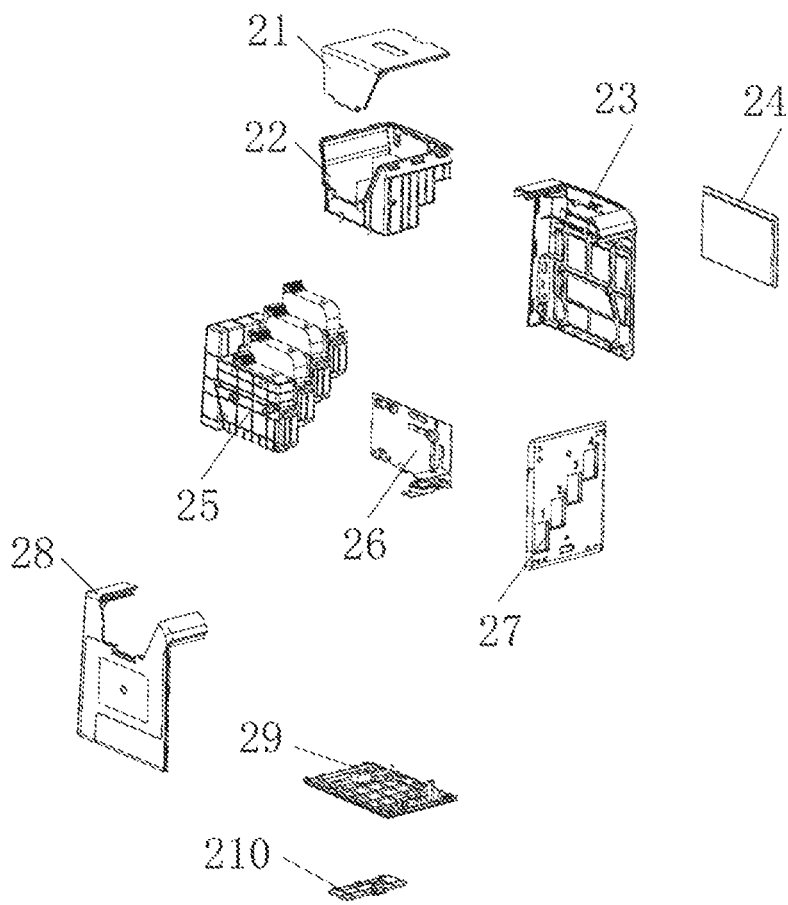
FIG. 3 is an exploded schematic diagram of a printer body according to an embodiment of the present disclosure.

Referring to FIG. 1 and in conjunction with FIG. 3, an embodiment of the present disclosure provides a handheld printer, including: a printer body 2, a protective nozzle cover 1 and a handle 3, the protective nozzle cover 1 and the handle 3 being arranged at two opposite ends of the printer body 2; the printer body 2 including a printing panel 27, the printing panel 27 being located at an inner side of the protective nozzle cover 1; the printing panel 27 being provided with at least two nozzles, the at least two nozzles being sequentially arranged along a first preset direction and a second preset direction and spaced apart, the first preset direction referring to a vertical direction, an included angle being formed between the second preset direction and the first preset direction.

Taking the relative position in FIG. 1 as an example for description, in this embodiment, the first preset direction refers to the vertical direction, and the second preset direction refers to a lateral direction. Specifically, the first preset direction is parallel to a height direction of the protective nozzle cover 1, and the second preset direction is parallel to a width direction of the protective nozzle cover 1. Especially referring to FIG. 4, this embodiment provides four nozzles. The four nozzles are numbered according to arrangements shown in FIGS. 4, 10, 11, 16 and 29. Taking FIG. 4 as an example, from bottom left to top right, a first nozzle 131, a second nozzle 132, a third nozzle 133, and a fourth nozzle 134 are respectively shown (the four nozzles are especially marked in FIG. 29). The working conditions of the four nozzles will be described in detail when a printing method of this embodiment is described later.

Specifically, the printer body 2 is of a cube-like structure. Taking the relative position in FIG. 1 as an example for description, the protective nozzle cover 1 is arranged in front of the printer body 2 to protect ink cartridges 25e. The handle 3 is arranged behind the printer body 2 and may be screwed or snapped to the printer body 2.

A printing panel 27 is arranged in front of the printer body 2, and the nozzles are arranged on the printing panel 27 to perform printing. The protective nozzle cover 1 is arranged on an outer side of the printing panel 27 to protect the nozzles. The handle 3 is arranged behind the printer body 2 and opposite to the printing panel 27. In this way, in actual operation, it is easier to operate for printing, keep the operation and printing balance, and improve the quality of printed products.

Figure 2:
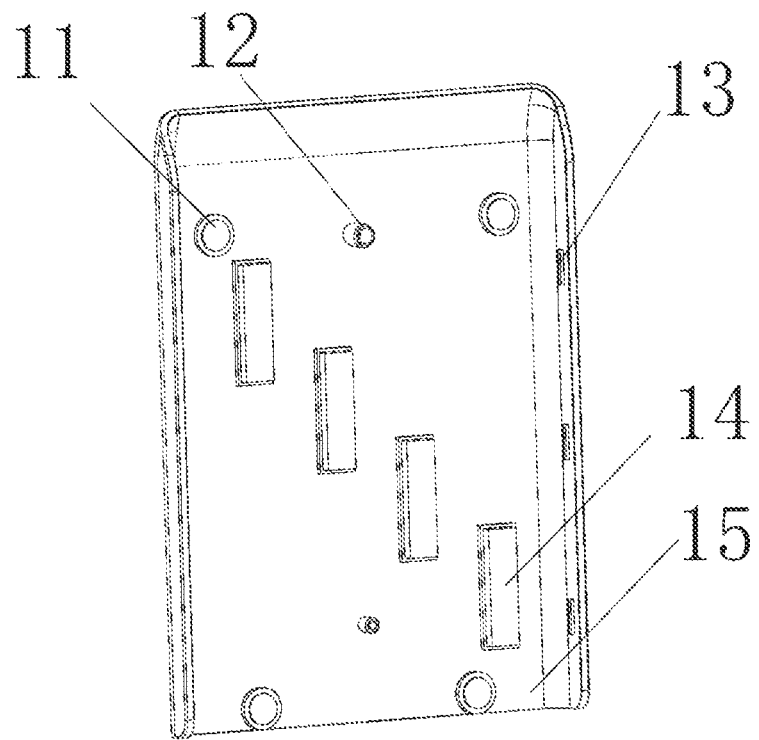
FIG. 2 is a schematic structural diagram of a protective nozzle cover according to an embodiment of the present disclosure.

Referring to FIG. 2, in this embodiment, the protective nozzle cover 1 is provided with locking grooves 13 snapped with the printer body 2; the protective nozzle cover 1 is further provided with strong magnets 11 mutually attracted to the printer body 2.

Specifically, referring to FIG. 2 again, the protective nozzle cover 1 includes the strong magnets 11, positioning columns 12, locking grooves 13, protective nozzle cottons 14 and a cover plate 15; the strong magnets 11 are fixed on the cover plate 15, the cover plate 15 is of a square shape, and four strong magnets 11 are provided and respectively symmetrically distributed at upper side, lower side, left side and right side of the cover plate 15. The positioning columns 12 match with the printer body 2, and two positioning columns 12 are provided and arranged at upper and lower ends of the cover plate 15, respectively. The locking grooves 13 are symmetrically distributed on two sides of the cover plate 15. A plurality of locking grooves 13 are provided and snapped with the printer body 2. The protective nozzle cottons 14 are fixedly connected to the cover plate 15 and distributed stepwise from top to bottom with an equal spacing therebetween in horizontal and vertical directions. The protective nozzle cottons 14 are placed in front of the nozzles of the ink cartridges 25e to protect the nozzles of the ink cartridges 25e.

Referring to FIG. 3, in this embodiment, the printer body 2 includes a top cover 21, a left side cover 23, a right side cover 28 and an electronic control module 26; and two sides of the printing panel 27 are respectively connected with the left side cover 23 and the right side cover 28 to form an upward opening; the top cover 21 is movably connected with the right side cover 28 so that the electronic control module 26 is in an on-or-off state when the opening is opened or closed.

Referring to FIG. 3 again, in this embodiment, the printer body 2 further includes a touch screen 24; the touch screen 24 is fixed on the left side cover 23, the electronic control module 26 is fixed on an inner side of the left side cover 23, and the touch screen 24 and the electronic control module 26 are electrically connected.

Referring to FIG. 3 again, in this embodiment, the printer body 2 further includes an upper cover 22, an ink cartridge support module 25 and the ink cartridges 25e; the upper cover 22 is arranged at the opening, and two opposite sides of the upper cover are connected to the left side cover 23 and the right side cover 28, respectively; and the ink cartridge support module 25 is arranged below the upper cover 22 and the ink cartridges 25e are installed between the upper cover 22 and the ink cartridge support module 25.

Figure 4:
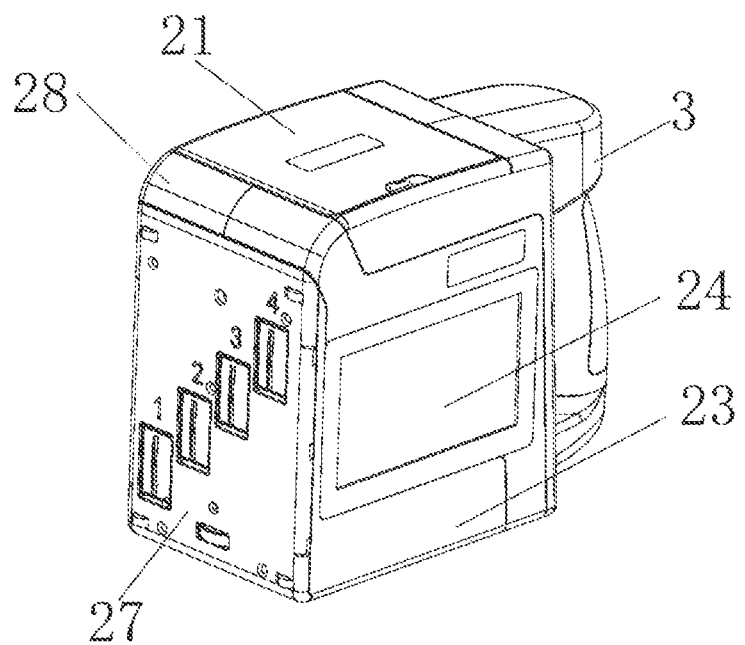
FIG. 4 is a schematic assembly diagram of a handheld printer according to an embodiment of the present disclosure after a protective nozzle cover is removed.

Specifically, referring to FIGS. 3 and 4, the printer body 2 includes a top cover 21, an upper cover 22, a left side cover 23, a touch screen 24, an ink cartridge support module 25, an electronic control module 26, a printing panel 27, a right side cover 28, a bottom plate 29, and a battery cover 210. The top cover 21 is hinged to the right side cover 28 and snapped with the upper cover 22. The upper cover 22 is snapped with the left side cover 23 and the right side cover 28, respectively. The touch screen 24 is placed on an outer side of the left side cover 23 and fixedly connected to the left side cover 23; the touch screen 24 is electrically connected to the electronic control module 26. The printing panel 27 is screwed to the ink cartridge support module 25 and the bottom plate 29, respectively. The electronic control module 26 is screwed to the left side cover 23 and provided with a power switch. The ink cartridge support module 25 is provided with positioning holes on two sides, and the positioning holes on the two sides are in fit with the positioning column on the right side cover 28 and the positioning column on the left side cover 23, respectively. The bottom plate 29 is screwed to the right side cover 28 and the left side cover 23, respectively. The battery cover 210 is snapped with the bottom plate 29. It should be noted that the "screwed" in the text refers to connection with a screw.

In view of the foregoing, the printer body 2 of this embodiment is simple to assemble and has high assembly accuracy and minor errors.

Figure 5:
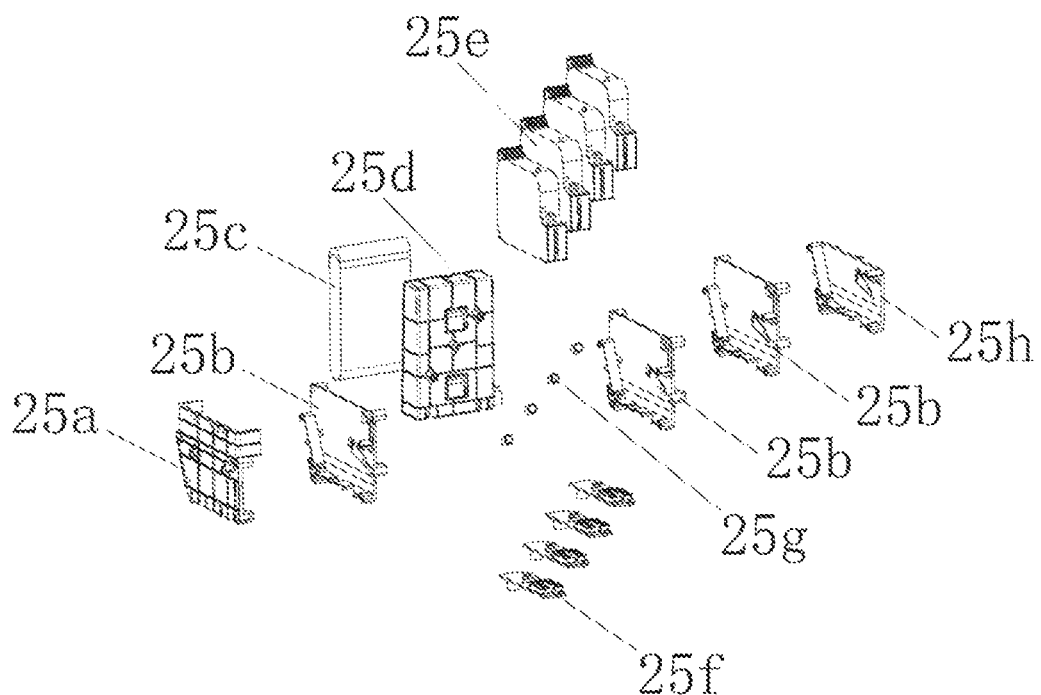
FIG. 5 is an exploded schematic diagram of an ink cartridge support module according to an embodiment of the present disclosure.

Referring to FIG. 5, in this embodiment, the ink cartridge support module 25 includes a plurality of ink cartridge locking plates,
wherein the plurality of ink cartridge locking plates are arranged sequentially in a direction from the left side cover 23 to the right side cover 28 and spaced apart, a locking groove for installing the ink cartridge 25e is formed between every two adjacent ink cartridge locking plates, all the locking grooves are arranged sequentially along the first preset direction and the second preset direction and spaced apart, and the upper cover 22 is connected to tops of the plurality of ink cartridge locking plates.

Referring to FIG. 5 again, in this embodiment, the printer body 2 further includes nozzle drive modules, electrically connected to the electronic control module 26; the nozzle drive modules are arranged under and electrically connected to the ink cartridges 25e; the nozzle drive modules drive the ink cartridges 25e to work under the control of the electronic control module 26.

Figure 6:
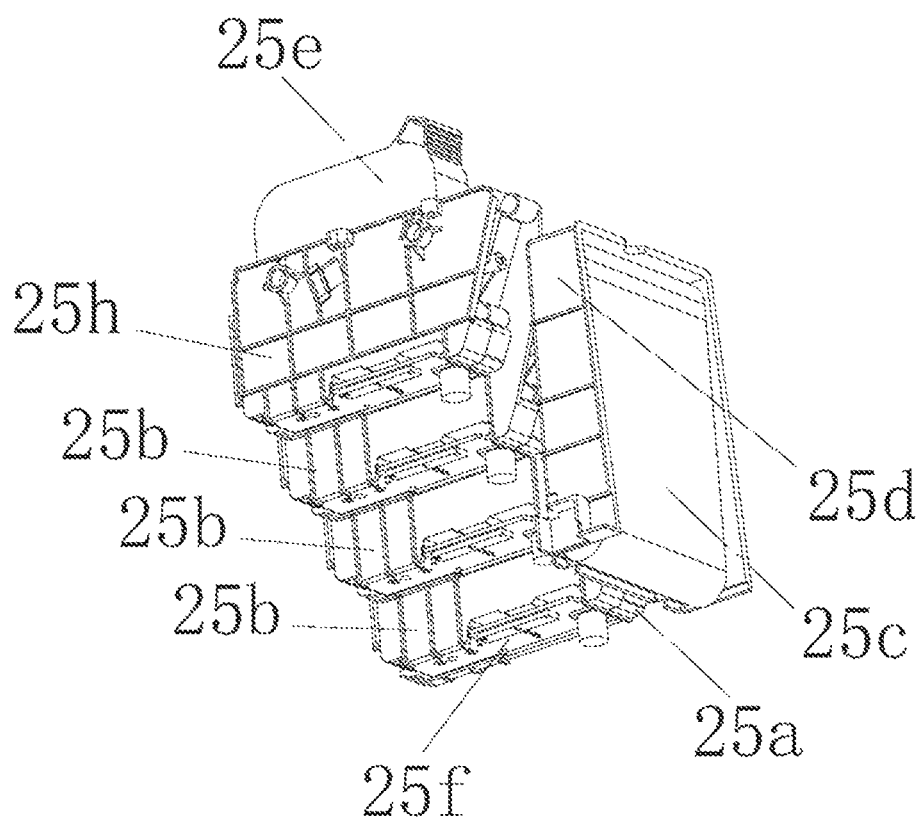
FIG. 6 is a schematic assembly diagram of an ink cartridge support module according to an embodiment of the present disclosure.

Referring to FIG. 5 again, in conjunction with FIG. 6, in this embodiment, the printer body 2 further includes a battery 25c and a battery hood 25d; the battery 25c is arranged in the battery hood 25d and electrically connected to the electronic control module 26, and the battery hood 25d is arranged on one side of the ink cartridge support module 25.

Specifically, referring to FIGS. 5 and 6, the ink cartridge support module 25 includes a plurality of ink cartridge locking plates, a battery 25c, an electromagnetic cover (battery hood) 25d, ink cartridges 25e, nozzle drive modules, and positioning beads 25g. The plurality of ink cartridge locking plates include a first ink cartridge locking plate 25a, second ink cartridge locking plates 25b, and a third ink cartridge locking plate 25h. Multiple second ink cartridge locking plates 25b are provided. The first ink cartridge locking plate 25a is screwed to the second ink cartridge locking plates 25b; the multiple second ink cartridge locking plates 25b are screwed to each other; the third ink cartridge locking plate 25h is screwed to the second ink cartridge locking plates 25b. The electromagnetic cover 25d is respectively screwed to the first ink cartridge locking plate 25a and the second ink cartridge locking plates 25b. The battery 25c is placed in the electromagnetic cover 25d. A plurality of ink cartridges 25e are provided and placed in the locking grooves formed after the ink cartridge locking plates are screwed together. Multiple nozzle drive modules are provided and placed in the locking grooves formed after the multiple ink cartridge locking plates are screwed together and under the ink cartridges 25e. The multiple nozzle drive modules are respectively in communication connection to the ink cartridges 25e and the electronic control module 26. The positioning beads 25g are placed in the locking grooves formed after the ink cartridge locking plates are screwed together to position the ink cartridges 25e. The positioning bead 25g is provided therein with a spring which can be compressed and deformed.

Figure 7:
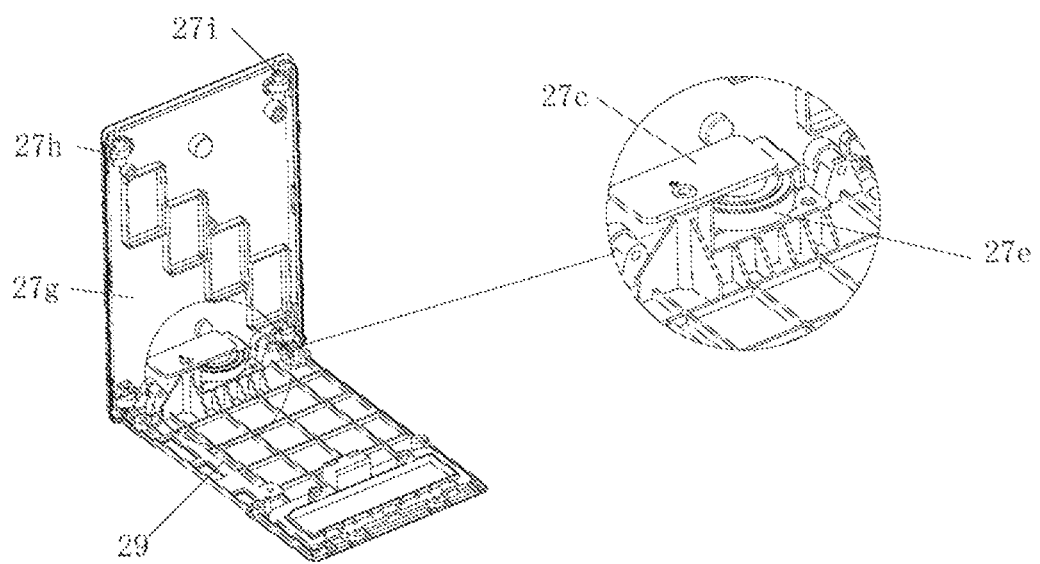
FIG. 7 is a schematic assembly diagram of a printing panel and a main roller structure according to an embodiment of the present disclosure.

Referring to FIG. 7, in this embodiment, the printer body 2 further includes a bottom plate 29 and a main roller structure,
wherein the bottom plate 29 is arranged at the bottoms of the left side cover 23 and the right side cover 28, the printing panel 27 is connected to the bottom plate 29, and the main roller structure is arranged on the bottom plate 29 and located at a bottom end of the printing panel 27.

Figure 8:
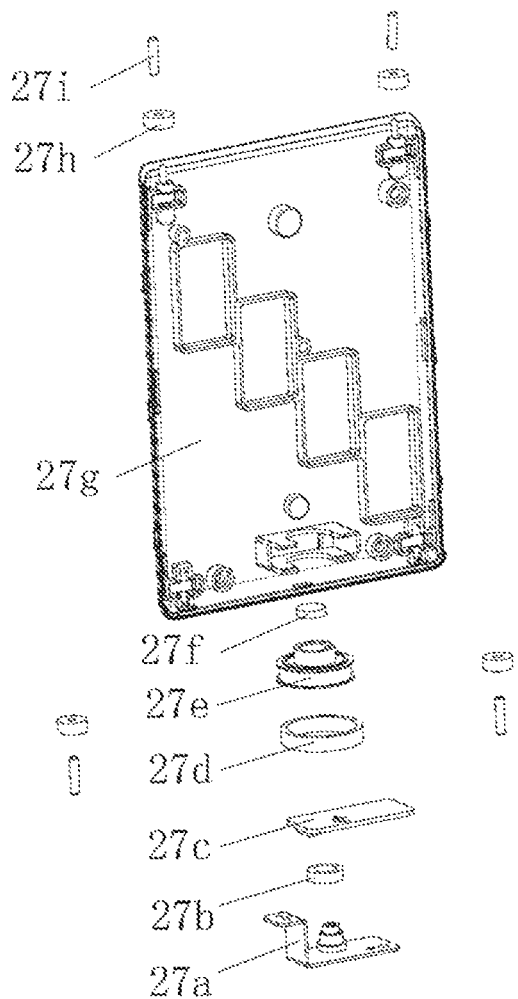
FIG. 8 is an exploded schematic diagram of a printing panel and a main roller structure according to an embodiment of the present disclosure.

Referring to FIG. 8, in this embodiment, the main roller structure includes a main roller 27e, a first bearing 27b and a mounting shaft, the mounting shaft is fixed on the bottom plate 29, and the main roller 27e is rotatably arranged on the mounting shaft through the first bearing 27b.

Specifically, referring to FIGS. 7 and 8, the main roller structure includes a sheet metal 27a, the first bearing 27b, a Hall chip board 27c, a rubber ring 27d, the main roller 27e, a magnet 27f, a front panel 27g, second bearings 27h, and steel shafts 27i. The second bearing 27h is configured as a rubber-coated bearing. The sheet metal 27a is fixedly connected to the Hall chip board 27c and the bottom plate 29, respectively; an inner ring of the first bearing 27b is in fit with a boss on the sheet metal 27a; the rubber ring 27d is in fit with a groove in the main roller 27e; the main roller 27e is in fit with an outer ring of the first bearing 27b; a groove in an upper end of the main roller 27e is in fit with the magnet 27f; and the main roller 27e is placed in a groove in the front panel 27g. An inner ring of the second bearing 27h is in fit with the steel shaft 27i; the second bearings 27h are symmetrically distributed with respect to the upper sider, the lower side, the left side and the right side of the front panel 27g; the second bearings 27h are placed in notches in the front panel 27g; the steel shaft 27i of an upper roller set penetrates through the front panel 27g and is in fit with a hole in the front panel 27g; the steel shaft 27i of a lower roller set is locked in the groove in the front panel 27g; the front panel 27g is provided with grooves in fit with the positioning columns 12 of the protective nozzle cover 1; a Hall chip of the Hall chip board 27c is placed right above the magnet 27f; the Hall chip board 27c is electrically connected to the electronic control module 26, and the speed of inkjet printing is controlled by the scrolling speed of the main roller 27e.

Figure 9:
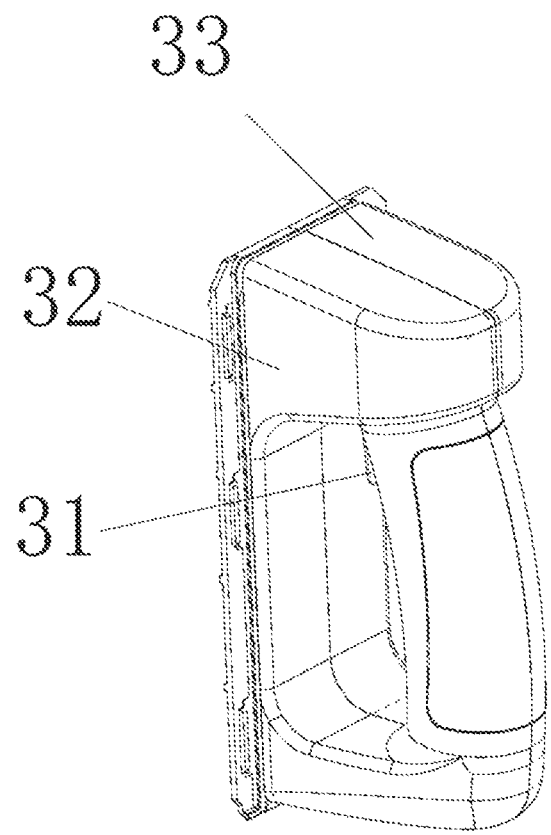
FIG. 9 is a schematic structural diagram of a handle according to an embodiment of the present disclosure.

Referring to FIG. 9, in this embodiment, the handle 3 includes a left plate 32, a right plate 33 and a printing button 31; the left plate 32 and the right plate 33 are arranged on and snapped with the left side cover 23 and the right side cover 28; a groove is formed at a junction of the left plate 32 and the right plate 33, and the printing button 31 is installed in the groove.

Specifically, referring to FIG. 9, the handle 3 includes the printing button 31, the left plate 32 and the right plate 33; the printing button 31 is placed in the grooves formed by the left plate 32 and the right plate 33; a rear end of the printing button 31 is provided with a spring to reset; the printing button 31 and the electronic control module 26 are electrically connected.

In view of the above, the overall control process of the handheld printer of this embodiment is as follows.

When the top cover 21 is opened, the electronic control module 26 is enabled, and printing information input by an operator through the touch screen 24 is stored in the electronic control module 26; in a case of printing, the operator operates the printing button 31 to start printing. After receiving the start signal, the electronic control module 26 sends a printing instruction to the nozzle drive module. After receiving the printing instruction, the nozzle drive module controls the ink cartridge nozzles and the main roller structure to work. The touch screen 24 is configured to input and display the printing information, and to display output printing information. In this case, the printing status can be viewed on the touch screen 24. In a case of stopping printing, the operator operates the printing button 31 so that the printing button 31 sends a stop signal to the electronic control module 26. After receiving the stop signal, the electronic control module 26 sends a stop signal to the nozzle drive modules, the nozzles stop inkjet and the printer stops printing.

When the top cover 21 is closed, the electronic control module 26 is disabled. In this case, the operator cannot operate the touch screen 24 or input printing information, and the printer does not work.

The working principle of the handheld printer of this embodiment described above is only a general working principle. Some specific working methods and printing methods of the handheld printer will be described below in detail.

On this basis, the handheld printer of this embodiment has at least the following advantages.

The printer body 2 and the handle 3 are arranged on two opposite sides of the printer body 2, which facilitates the balance of the printer body 2 during operation and printing, thereby improving the printing efficiency and quality.

The printer body 2 including the top cover 21, the upper cover 22, the left side cover 23, the touch screen 24, the ink cartridge support module 25, the electronic control module 26, the printing panel 27, the right side cover 28, the bottom plate 29, the battery cover 210, the upper cover 22, the ink cartridge support module 25 and the ink cartridges 25e has reasonable layout, compact structure, small size and light weight. In addition, since the design of the handle 3 conforms to man-machine engineering, the handle is comfortable to hold and not easy to cause fatigue.

Further, this embodiment further provides a printing method, intended to use a multi-nozzle handheld printer 10 to cope with the problem that images printed by the current handheld printers adopting a single nozzle setting are too small in breadth. In the prior art, if a user wants to print a large-breadth image, the user usually has to print it repeatedly, which is inefficient and time-consuming. In other words, in the printing method given below, the multi-nozzle related concept of the handheld printer 10 of the embodiment of the present disclosure described above is involved. Based on this concept, in the printing method to be described below, in this embodiment, the printing order of the nozzles is determined by a preset printing origin and the position offset of each nozzle determined according to the printing origin, and this will be described in detail below. As an example, the printing method given below can be implemented by the handheld printer 10 described above. However, in the following description of the printing method, in order to simplify the description, only the features of the handheld printer 10 related to the following printing method will be described.

Figure 10:
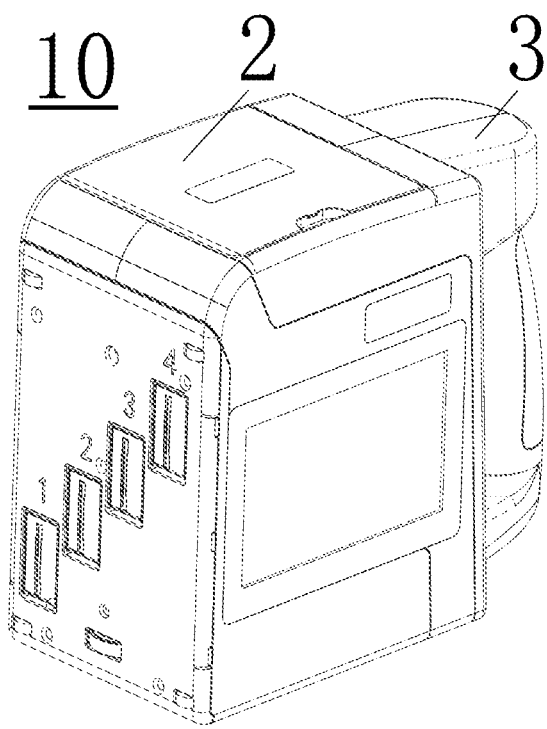
FIG. 10 is a schematic diagram of another isometric view of an assembly drawing of a handheld printer according to an embodiment of the present disclosure.

Referring to FIGS. 10 to 17, and particularly referring to FIG. 10, Although it has been mentioned in the above description, for ease of understanding, it is reiterated here that the handheld printer 10 of this embodiment includes a printer body 2, a handle 3, multiple nozzles as described above (i.e., first to fourth nozzles) and a controller (including an electronic control module 26 and nozzle drive modules).

Further, it is reiterated here that the handle 3 is arranged behind the printer body 2. The multiple nozzles are arranged in a staggered way in front of the printer body 2, that is, on the printing panel 27. In use, the user holds the handle 3, and then slides the printing panel 27 of the printer body 2 of the handheld printer 10 over a specified area, and a preset printing content can be printed in the specified area through the multiple nozzles on the printing panel.

In the above, the controller (i.e., the general name of the electronic control module 26 and the nozzle drive modules) is arranged inside the printer body 2. The nozzle drive modules are electrically connected to the multiple nozzles. The electronic control module 26 is configured to obtain the content to be printed; determine the printing content of each nozzle according to the content to be printed; and control each nozzle to print its own printing content at a printing position according to a preset printing origin and a position offset of each nozzle determined based on the printing origin.

The above-mentioned electronic control module 26 can be configured as a single-chip microcomputer, such as a 51 single-chip microcomputer and a PLC (Programmable Logic Controller), or can be configured as a general-purpose processor, including a CPU (Central Processing Unit), an NP (Network Processor), etc. The above-mentioned electronic control module can also be configured as a DSP (Digital Signal Processing), an ASIC (Application Specific Integrated Circuit), an FPGA (Field-Programmable Gate Array) or other programmable logic devices, discrete gates or transistor logic devices, or discrete hardware components. The general-purpose processor may be configured as a microprocessor or the electronic control module 26 may also be configured as any conventional processor or the like.

Figure 11:
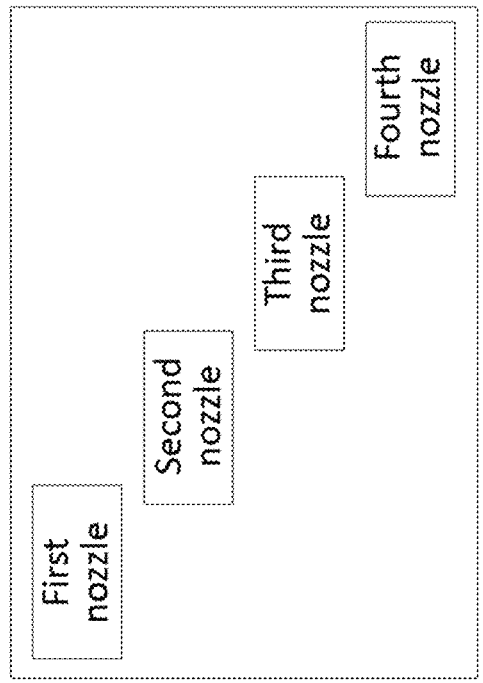
FIG. 11 is a schematic structural diagram of nozzles on a printing panel according to an embodiment of the present disclosure.

Referring to FIG. 11, the following describes the arrangement structure of the nozzles. The multiple nozzles are arranged in a staggered way on the printing panel 27 of the printer body 2. As mentioned above, the nozzles are parallel in both a length direction and a width direction. It should be noted that the area where each nozzle performs printing refers to an area swept by a long side of the nozzle. The multiple nozzles are arranged in a staggered way so that the areas swept by the nozzles have overlap portions. By the overlap portion of every two adjacent areas, the finally combined image has better integrity. In addition, the overlap portion of every two adjacent areas also facilitates the debugging of the handheld printer in an early stage.

Taking the handheld printer with four nozzles in FIG. 11 as an example, the four nozzles are spaced part by equal intervals. In combination with FIG. 29, the first nozzle 131 is arranged at the lower left of the printing panel of the printer body 2, the fourth nozzle 134 is arranged at the upper right of the printing panel of the printer body 2, and the second nozzle 132 and the third nozzle 133 are arranged between the first nozzle 131 and the fourth nozzle 134. The second nozzle 132 is arranged at the upper right of the first nozzle 131, and the third nozzle 133 is arranged at the upper right of the second nozzle 132.

In use, the user holds the handle 3 and then slides the printing panel of the printer body 2 of the handheld printer to the right to go across the specified area, and the first nozzle 131, the second nozzle 132, the third nozzle 133, and the fourth nozzle 134 will start printing sequentially on the specified area. For example, if the first nozzle 131 is used as the initial printing position of the specified area, the first nozzle 131 has already started printing when the user just starts to slide the printing panel. During the user's sliding process, the second nozzle 132 also starts printing after reaching the initial printing position. Then, the third nozzle 133 starts printing after reaching the initial printing position, and finally the fourth nozzle 134 also reaches the initial printing position and starts printing.

Figure 12:
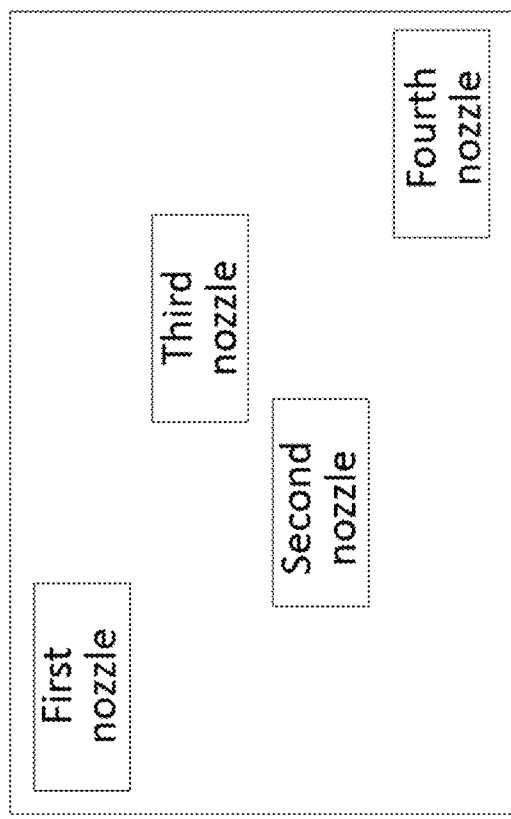
FIG. 12 is another schematic structural diagram of nozzles on a printing panel according to an embodiment of the present disclosure.

In another arrangement of nozzles, for the position setting of the nozzles, the structure shown in FIG. 12 may also be adopted. The four nozzles may also be staggered as follows: the first nozzle is arranged at the lower left of the printing panel of the printer body 2, the fourth nozzle is arranged at the upper right of the printing panel of the printer body 2, and the second nozzle and the third nozzle are arranged between the first nozzle and the fourth nozzle. The second nozzle is arranged at the upper left of the third nozzle. Certainly, the above-mentioned position structure of the nozzles can also be applied to a three-nozzle handheld printer or a six-nozzle handheld printer.

According to an embodiment of the present disclosure, for example, the long side of each nozzle may be 0.5 inches. Since the printing areas of the nozzles have overlap portions, the nozzles as shown in FIG. 11 can print an image with a breadth close to 2 inches.

In other embodiments, the long side of each nozzle may also be 1 inch. The long sides of the nozzles may also be unequal. In this regard, it will not be limited in the present disclosure.

For ease of understanding, it needs to be reiterated that the handheld printer of the embodiment of the present disclosure also includes a touch screen 24, electrically connected to the electronic control module 26. The touch screen 24 is configured to display a printed content which can be a text, an image, a two-dimensional code or the like. Certainly, the touch screen 24 may further include a start button. When the user clicks the start button on the touch screen 24, the electronic control module 26 will receive a printing instruction sent by the touch screen 24, and then control the multiple nozzles to perform printing.

In addition, the handheld printer of the embodiment of the present disclosure further includes a communication module. The communication module is electrically connected to the electronic control module 26. The communication module of the handheld printer is configured to be in communication connection with a terminal device, and the terminal device can be a mobile phone, a tablet computer, or the like. The user can send a content to be printed to the handheld printer through a terminal device such as a mobile phone. The communication module may be configured as a Bluetooth module, a Wi-Fi module, or an NFC (Near Field Communication) module, which is not limited in the present disclosure.

It can be understood that the handheld printer may further include more or fewer components than those described above. Therefore, the structure shown in the drawings cannot be taken as a limitation to the present disclosure.

Figure 13:
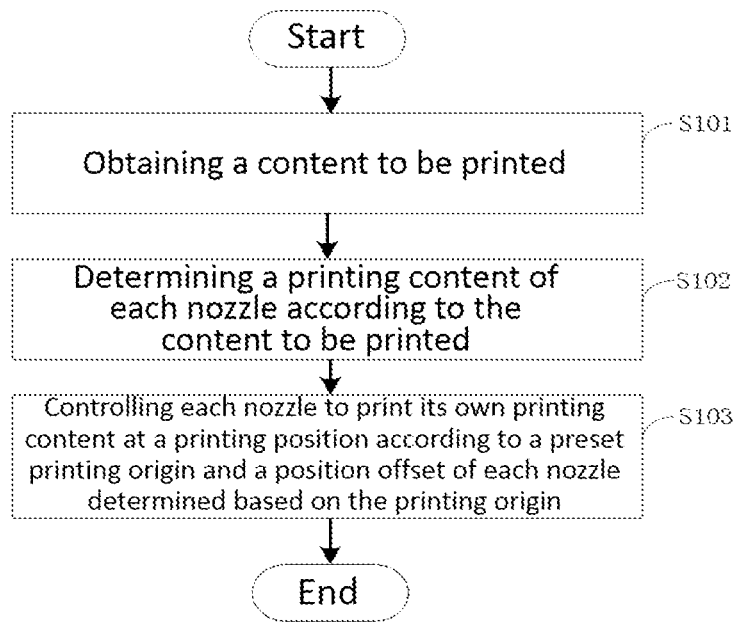
FIG. 13 is a flowchart of steps of a printing method according to an embodiment of the present disclosure.

Referring to FIG. 13, the printing method of this embodiment will be described below in general, and the printing method is applied to the controller in the handheld printer 10 of the above-mentioned embodiment. The method includes the following steps S101 to S103.

In step S101, a content to be printed is obtained.

In step S102, a printing content of each nozzle is determined according to the content to be printed.

In step S103, each nozzle is controlled to print its own printing content at a printing position according to a preset printing origin and a position offset of each nozzle determined based on the printing origin.

In this embodiment, after obtaining the content to be printed, the controller determines the printing content of each nozzle according to the content to be printed and then controls each nozzle to print its own printing content at a printing position, respectively, according to a preset printing origin and a position offset of each nozzle determined based on the printing origin. Finally, what is displayed at the printing position is a combination of the printing contents of all the nozzles. According to the embodiment of the present disclosure, the superimposition of multiple nozzles is used to increase the breadth of an image printed at one time, which breaks through the limitation of single-nozzle printing in the prior art and improves the printing efficiency.

The above steps are described below in conjunction with specific examples.

In step S101, a content to be printed is obtained.

The controller may obtain the content to be printed through the communication module of the handheld printer 10, for example, sending the content to be printed to the handheld printer via Bluetooth transmission. The content to be printed may be a text, an image, a two-dimensional code, or the like.

In step S102, a printing content of each nozzle is determined according to the content to be printed.

As an implementation manner, step S102 may include: according to the number of nozzles, splitting the content to be printed into parts to be printed in the same number as the number of nozzles. According to the order of the nozzles, the printing contents of all the nozzles are determined in sequence.

Figure 14:
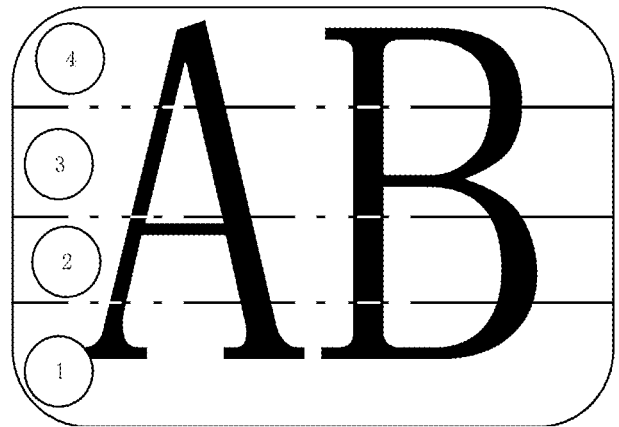
FIG. 14 is a schematic diagram of an image splitting method according to an embodiment of the present disclosure.

An example is described below for explanation. Referring to FIG. 14, a four-nozzle handheld printer is described as an example. Assuming that the content to be printed is letters AB, the content to be printed AB is split into four parts according to the number of nozzles. Then, according to the order of the nozzles, the printing contents of all the nozzles are determined in sequence. It should be noted that the nozzles are ordered from top to bottom. Taking the structure of the nozzles shown in FIG. 11 as an example, the printing content of the first nozzle 131 is defined as Area 1 in FIG. 14, the printing content of the second nozzle 132 is defined as Area 2 in FIG. 14, the printing content of the third nozzle 133 is defined as Area 3 in FIG. 14, and the printing content of the fourth nozzle 134 is defined as Area 4 in FIG. 14.

In the embodiment of the present disclosure, according to the number of nozzles, the content to be printed is split into parts to be printed in the same number as the number of nozzles. By distributing the part to be printed to the corresponding nozzle, the handheld printer can print out an image with the largest breadth supported by the handheld printer.

As another implementation manner, step S102 may include: splitting the content to be printed into parts to be printed in a preset number. According to the order of the nozzles, the printing contents of all the nozzles are determined in sequence.

It should be noted that the aforementioned preset number is less than the number of nozzles. For example, when the number of nozzles is 6, the preset number may be any integer from 1 to 5. For example, the preset number may be 3 or 4.

Figure 15:
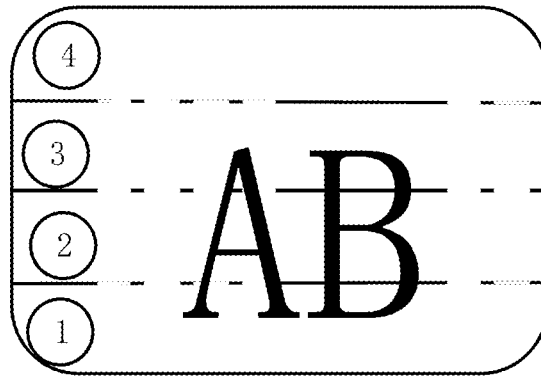
FIG. 15 is a schematic diagram of another image splitting method according to an embodiment of the present disclosure.

An example is described below for explanation. Referring to FIG. 15, a four-nozzle handheld printer is described as an example. Assuming that the content to be printed is letters AB and the preset number is 3, the content AB to be printed is split into three parts. Then, according to the order of the nozzles, the printing contents of all the nozzles are determined in sequence. Here, the nozzles required for printing can be user defined. Taking the structure of the nozzles shown in FIG. 11 as an example, it is possible that the printing content of the first nozzle 131 is defined as Area 1 in FIG. 15, the printing content of the second nozzle 132 is defined as Area 2 in FIG. 15, the printing content of the third nozzle 133 is defined as Area 3 in FIG. 15, and the fourth nozzle 134 does not work for printing. Certainly, AB may also be placed in Areas 2 to 4. Correspondingly, the first nozzle 131 does not work for printing, and the second nozzle 132, the third nozzle 133, and the fourth nozzle 134 work for printing AB.

It can be understood that when the preset number is 2, the first nozzle 131 and the second nozzle 132 may print the content to be printed, or the third nozzle 133 and the fourth nozzle 134 may print the content to be printed. In this regard, no limitation is made in the present disclosure.

According to an embodiment of the present disclosure, after the controller obtains the content to be printed, the content to be printed may be split into parts to be printed in a preset number, and the preset number is less than the number of nozzles. In other words, the user can use any number of nozzles to print the image, thus defining the size of the breadth by the user.

In step S103, each nozzle is controlled to print its own printing content at a printing position according to a preset printing origin and a position offset of each nozzle determined based on the printing origin.

Optionally, the position offset of each nozzle is determined as follows. Coordinates of each nozzle are first determined according to the preset printing origin. The position offset of each nozzle is then determined according to the coordinates of each nozzle.

Figure 16:
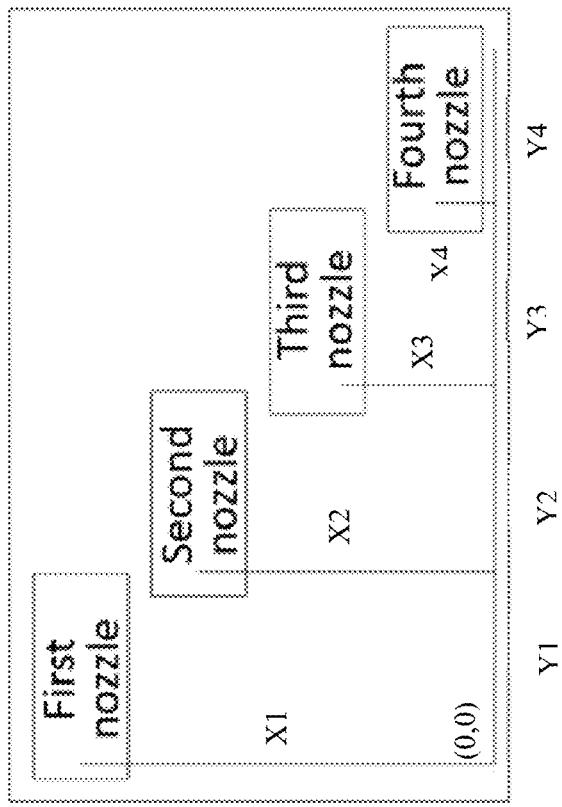
FIG. 16 is a schematic diagram of determining a position offset of a nozzle according to an embodiment of the present disclosure.

As shown in FIG. 16, assuming that the lower right corner of the printing panel 27 of the printer body 2 is defined as the printing origin, the coordinates (X1, Y1) of the first nozzle 131, the coordinates (X2, Y2) of the second nozzle 132, the coordinates (X3, Y3) of the third nozzle 133, and the coordinates (X4, Y4) of the fourth nozzle 134 can be determined according to the printing origin. Then, the position offset of each nozzle can be determined according to the coordinates of each nozzle. X1 is determined as the position offset of the first nozzle 131, X2 is determined as the position offset of the second nozzle 132, X3 is determined as the position offset of the third nozzle 133, and X4 is determined as the position offset of the fourth nozzle 134.

According to the embodiment of the present disclosure, the position offset of each nozzle is determined by coordinates, which can improve the accuracy of the obtained position offset of each nozzle.

Certainly, in other embodiments, the printing origin may also be at the upper left corner of the printing panel; or the coordinates of the first nozzle 131 may be defined as the printing origin.

Optionally, the above step S103 may include: determining a printing order of the nozzles according to the preset printing origin and the position offset of each nozzle determined based on the printing origin, wherein the position of the nozzle firstly used for printing is defined as the initial printing position. The nozzle firstly used for printing is controlled to start printing its printing content from the initial printing position, and other nozzles are controlled to print their respective corresponding printing contents after reaching the initial printing position.

The following description will be given with a four-nozzle handheld printer in FIG. 16. According to the preset printing origin and the position offset of each nozzle determined based on the printing origin, the nozzle firstly used for printing, the nozzle secondly used for printing, the nozzle thirdly used for printing, and the nozzle fourthly used for printing the nozzle are determined.

A direction preset by the controller refers to the direction of sliding to the right. In other words, when the user holds the handheld printer 10 shown in FIG. 10 and then slides to the right, the first nozzle 131, the second nozzle 132, the third nozzle 133, and the fourth nozzle 134 in FIG. 16 are determined as the nozzle firstly used for printing, the nozzle secondly used for printing, the nozzle thirdly used for printing, and the nozzle fourthly used for printing, respectively. The position of the nozzle firstly used for printing is defined as the initial printing position, that is, the position of the first nozzle is the initial printing position.

Then, the controller controls the first nozzle 131 to start printing its printing content from the initial printing position. When the second nozzle 132 reaches the initial printing position, the second nozzle 132 is controlled to start printing its printing content from the initial printing position. When the third nozzle 133 reaches the initial printing position, the third nozzle 133 is controlled to start printing its printing content from the initial printing position. When the fourth nozzle 134 reaches the initial printing position, the fourth nozzle 134 is controlled to start printing its printing content from the initial printing position.

It should be noted that whether each nozzle reaches the initial printing position can be determined according to the position offset of each nozzle. For example, if the position of the first nozzle 131 is defined as the initial printing position, a distance between the second nozzle 132 and the first nozzle 131 is X1-X2, when the moving distance of the handheld printer 10 is X1-X2, the second nozzle 132 reaches the initial printing position, and the controller controls the second nozzle 132 to start printing the printing content of the second nozzle from the initial printing position. Similarly, when the moving distance of the handheld printer 10 is X1-X3, the third nozzle 133 reaches the initial printing position, and the controller controls the third nozzle 133 to start printing the printing content of the third nozzle from the initial printing position.

To sum up, in this embodiment, the printing order of the nozzles is determined according to the preset printing origin and the position offset of each nozzle determined based on the printing origin. Then, the nozzle firstly used for printing is controlled to start printing its printing content from the initial printing position, and other nozzles are controlled to print their respective corresponding printing contents after reaching the initial printing position. In this way, it can be ensured that, finally, a complete image can be combined by multiple nozzles at the same printing position, thus improving the accuracy and completeness of printing large-breadth images through multiple nozzles. In addition, the number of nozzles is 4 in this embodiment of the present disclosure. By the four nozzles, it can be ensured that images with a large enough breadth can be printed, and the problem that a handheld printer using more nozzles is too large to use conveniently by users can be avoided.

Figure 17:
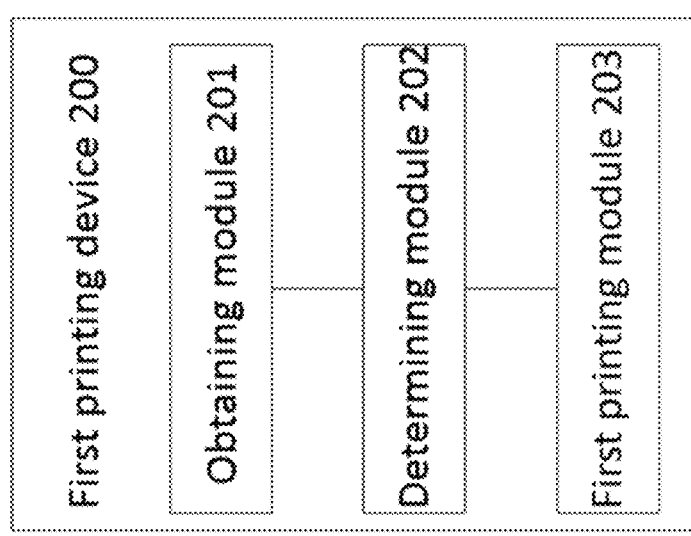
FIG. 17 is a block diagram of modules of a first printing device according to an embodiment of the present disclosure.

Referring to FIG. 17, based on the same inventive concept, an embodiment of the present disclosure further provides a printing device. In order to distinguish this printing device from another printing device described later, the printing device to be described here in this embodiment is called "first printing device 200", and the first printing device 200 is applied to the controller in the handheld printer 10. The first printing device 200 includes: an obtaining module 201, a determining module 202, and a first printing module 203.

The obtaining module 201 is configured to obtain a content to be printed.

The determining module 202 is configured to determine a printing content of each nozzle according to the content to be printed.

The first printing module 203 is configured to control each nozzle to print its own printing content at a printing position according to a preset printing origin and a position offset of each nozzle determined based on the printing origin.

Optionally, the determining module 202 is further configured to split the content to be printed into parts to be printed in the same number as the number of nozzles according to the number of the nozzles; and determine a printing content of each nozzle in sequence according to an order of the nozzles.

Optionally, the determining module 202 is further configured to split the content to be printed into parts to be printed in a preset number, wherein the preset number is less than the number of the nozzles; and determine the printing content of each nozzle in sequence according to the order of the nozzles.

Optionally, the determining module 202 is further configured to determine coordinates of each nozzle according to the preset printing origin; and determine a position offset of each nozzle according to the coordinates of each nozzle.

Optionally, the first printing module 203 is specifically configured to determine the printing order of the nozzles according to the preset printing origin and the position offset of each nozzle determined based on the printing origin, wherein a position of the nozzle firstly used for printing is defined as an initial printing position; control the nozzle firstly used for printing to start printing its printing content from the initial printing position, and when other nozzles reach the initial printing position, control the other nozzles to print their respective corresponding printing contents.

Optionally, the number of the nozzles is 4, and the first printing module 203 is specifically configured to determine the nozzle firstly used for printing, the nozzle secondly used for printing, the nozzle thirdly used for printing, and the nozzle fourthly used for printing the nozzle according to the preset printing origin and the position offset of each nozzle determined based on the printing origin, wherein the position of the nozzle firstly used for printing is defined as the initial printing position; control the nozzle firstly used for printing to start printing its printing content from the initial printing position; control the nozzle secondly used for printing to start printing its printing content from the initial printing position when the nozzle secondly used for printing reaches the initial printing position; control the nozzle thirdly used for printing to start printing its printing content from the initial printing position when the nozzle thirdly used for printing reaches the initial printing position; and control the nozzle fourthly used for printing to start printing its printing content from the initial printing position when the nozzle fourthly used for printing reaches the initial printing position.

Based on the same inventive concept, this embodiment further provides a storage medium having a computer program stored thereon, and the computer program executes the method of the foregoing embodiment when operated.

The storage medium may be any available medium that can be accessed by a computer or a data storage device integrated with one or more available media, such as a server or a data center. The available medium may be a magnetic medium (such as a floppy disk, a hard disk and a magnetic tape), an optical medium (such as a DVD), or a semiconductor medium (such as an SSD (Solid State Disk)).

This embodiment further provides an information processing method, applied to the handheld printer 10 described above. As for the difference between this information processing method and the above printing method, the above printing method is intended to improve the output (i.e., the printing process) of the handheld printer 10, but the information processing method to be described is intended to improve the information input process of the handheld printer 10. Specifically, unlike a non-handheld printer, the handheld printer can be operated on a mobile basis, so the handheld printer has a relatively small editing interface. For the operation process of a handheld printer, a user usually inputs a content object to be printed into the handheld printer, and then the user performs a corresponding editing operation on the input content object through a UI (User Interface) of the handheld printer. After the user inputs an editing operation, the handheld printer will perform the editing operation to obtain and display a corresponding result of the editing operation. In the case of a relatively small editing interface, it is more likely to cause a situation where multiple content objects are overlapped on the editing interface after the editing operation.

Figure 18:
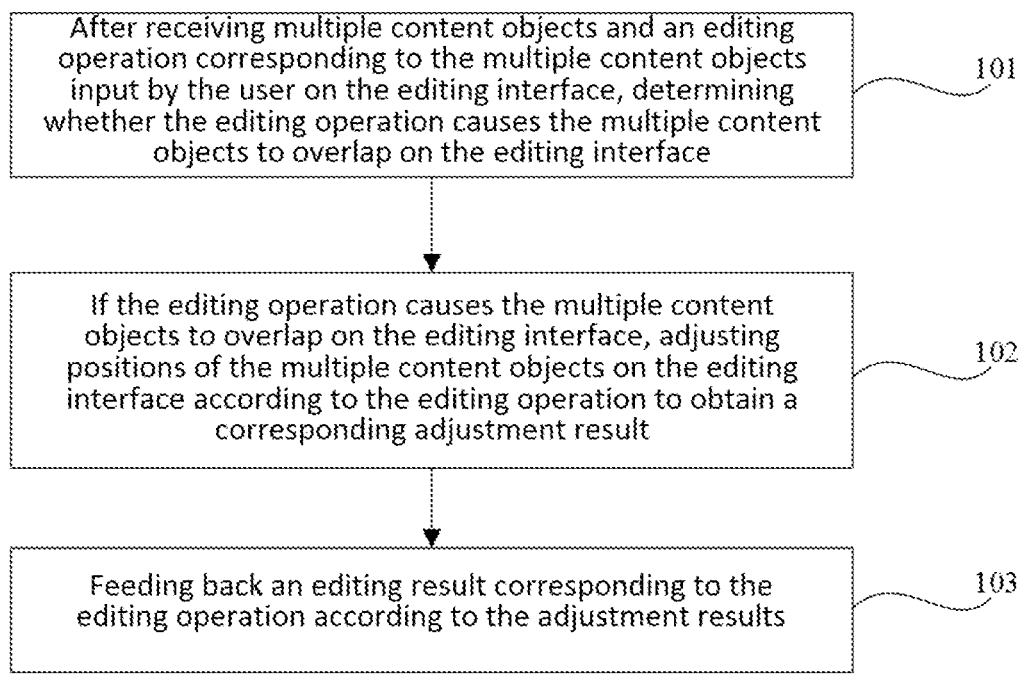
FIG. 18 is a flowchart of an information processing method according to the embodiment of the present disclosure.

Based on the above application scenarios, in order to overcome the above technical problems, reference will be made to FIG. 18 for the information processing method according to the embodiment of the present disclosure. The method includes the following steps.

In step 101, after multiple content objects and an editing operation corresponding to the multiple content objects input by the user on the editing interface are received, whether the editing operation causes the multiple content objects to overlap on the editing interface is determined.

In step 102, if the editing operation causes the multiple content objects to overlap on the editing interface, positions of the multiple content objects on the editing interface are adjusted according to the editing operation to obtain a corresponding adjustment result.

In step 103, an editing result corresponding to the editing operation is fed back according to the adjustment result.

According to an embodiment of the present disclosure, after the user inputs a related editing operation on the editing interface, if it is determined that the editing operation will cause the content objects to overlap on the editing interface, the positions of the content objects on the editing interface are automatically adjusted according to the editing operation to obtain and feedback the corresponding adjustment results. Compared with the prior art that the result of the user's editing operation is displayed directly and then the user performs further editing processing, after the user inputs the content objects and the corresponding editing operation, if the editing operation will cause content overlap, the printer can adjust the content objects on the editing interface according to the editing operation and thus the user does not need to manually adjust the result of the editing operation, thereby avoiding overlaps and re-editing by the user to a certain extent, reducing the difficulty of editing by the user, facilitating the user's operations, and further improving the user experience.

The detailed implementation process of step 101 to step 103 will be described as follows.

In step 101, the editing interface refers to a user editing interface on the handheld printer, and the size of the editing interface is adapted to the size of a display interface of the handheld printer. For example, the size of the editing interface is ¾ of the size of the display interface. The multiple content objects may be texts, pictures, two-dimensional codes, barcodes, dates, labels and other forms of content.

The editing operation corresponding to the content objects may be moving, arranging, and so on. Taking the moving operation as an example, the editing operation corresponding to the content objects can be to move one content object to the front, back, or top of another content object. For each content object, each content object input will have a corresponding coordinate area on the editing interface. After the editing operation is performed, the content objects may overlap. Therefore, it is required to determine whether the editing operation will cause the multiple content objects to overlap on the editing interface.

As an optional embodiment, step 101 may include: determining, according to the editing operation, whether areas occupied by the multiple content objects on the editing interface have overlaps after the editing operation, wherein if areas occupied by the multiple content objects on the editing interface have overlaps after the editing operation, it is determined that the editing operation will cause the multiple content objects to overlap on the editing interface.

In this embodiment, for the areas occupied after the editing operation, in a case of moving operation, the moving operation is to move a content object from position A to position B, and an area occupied by the content object after the editing operation is an area where position B is located. Further, during the editing operation, the position of only one content object among the multiple content objects may need to be changed, then areas occupied by the content objects other than the one content object after the editing operation are initially occupied areas.

The occupied area is related to the form of the content object. For example, if the content object is a piece of text, then the size of the area occupied by this piece of text is related to the length and width of this piece of text; if the content object is a picture, then the size of the area occupied by this picture is related to the size of the picture. Certainly, the size here refers to the size of the picture on the current editing interface. If the content object is in other forms, similar to the two enumerated forms, they will not be enumerated here.

During the process of determining whether the areas occupied by the content objects have overlaps, it can be implemented through the coordinates of the areas occupied by the content objects. For example, the coordinates of all coordinate points in the areas occupied by the content objects are compared. If the same coordinates are found, it means that the two occupied areas have overlaps. If no same coordinates are found, it means that the two occupied areas do not overlap.

In addition, it should be noted that in step 101, only whether the areas have overlaps or not needs to be determined, and the result after performing the editing operation is not displayed. In other words, the user inputs an editing operation, and the handheld printer determines and processes the editing operation at the background so that the final result that the user sees is a result without content overlap.

Further, if it is determined that the areas occupied by the multiple content objects have overlaps after the editing operation, it is determined that the editing operation will cause the multiple content objects to overlap on the editing interface, and step 102 is executed in this case. If it is determined that the areas occupied by the multiple content objects do not overlap after the editing operation, it is determined that the editing operation will not cause the multiple content objects to overlap on the editing interface. In this case, the editing operation can be performed directly, and the result after performing the editing operation will be displayed.

According to an embodiment of the present disclosure, during the process of determining whether the editing operation will cause the multiple content objects to overlap on the editing interface, the editing interface can be regarded as multiple area blocks. If the areas occupied by the multiple content objects have overlaps after the editing operation, it means that the multiple content objects will also have overlaps in final display. Therefore, whether the content objects will have overlaps can be determined through the overlaps of the areas. In this way, a result can be obtained quickly and accurately and the efficiency of information processing can be improved.

In step 102, the positions of the multiple content objects on the editing interface are adjusted according to the editing operation to obtain corresponding adjustment results. This step is equivalent to an anti-overlap processing process. For different editing operations, step 102 may be implemented in different ways. As an optional embodiment, assuming that multiple content objects include a first content object and a second content object, step 102 includes: if the editing operation is to move the first content object to the target direction of the second content object, determining whether there is an unoccupied matching area in the target direction which does not overlap with the area where the second content object is located and which can accommodate the first content object, wherein if there is a matching area in the target direction, the first content object is moved to the matching area to obtain an adjustment result.

Here, the multiple content objects may further include other content objects in addition to the first content object and the second content object, but the content objects involved in the moving operation are the first content object and the second content object. For the target direction, assuming that the coordinates include X and Y coordinates, the target direction can be an X coordinate direction, a Y coordinate direction, or other directions based on the X and Y coordinate directions.

Further, the matching area refers to an area which does not overlap with the area where the second content object is located, is not occupied and can accommodate the first content object. The matching area can be understood as the area which does not overlap with the area where the second content object is located in the target direction, and the area should be large enough to accommodate the first content object. Further, if there is a matching area, when the first content object is moved to the matching area, the first content object can be moved to a position on the matching area close to the second content object, so that the first content object and the second content object can be arranged more orderly and beautifully.

In addition, in this embodiment, in addition to restricting the target direction, the editing operation may also be moving to a specified position in the target direction or only moving to a specific position, that is, specifying a position to which the first content object is to be moved. In this case, the matching area refers to an area where the specified area is located and which does not overlap with the area where the second content object is located and can accommodate the first content object. When it is determined that there is the matching area, the first content object is moved to the matching area.

According to an embodiment of the present disclosure, assuming that the editing operation is to move the first content object to the target direction of the second content object, whether there is a matching area in the target direction may be first determined; and if there is a matching area in the target direction, the first content object is moved to the matching area. In this way, the overlap of the first content object and the second content object on the editing interface is avoided, and thus the anti-overlap processing is implemented quickly and accurately.

In step 102, a case of no matching area is also included. In this case, the method further includes: if there is no matching area in the target direction, obtaining an adjustment result without moving the first content object.

In this embodiment, when no matching area is found during the anti-overlap processing process, the user's editing operation may not be performed in this case, that is, the first content object is not moved, and the user's editing operation is invalid by default. Anti-overlap is achieved through an invalid editing operation and the efficiency of information processing is thus improved.

Further, after the adjustment result is obtained in step 102, step 103 is executed, and an editing result corresponding to the editing operation is fed back according to the adjustment result. Since the matching area may or may not be found in step 102, step 103 may also be implemented in a different way.

If the matching area is found in step 102, step 103 includes: displaying the adjustment result on the editing interface. In this embodiment, the adjustment result obtained through the anti-overlap processing can be directly displayed as the editing result corresponding to the editing operation, so that the user sees a content without overlap on the editing interface, thus improving the user experience.

If no matching area is found in step 102, step 103 includes: generating a user prompt indicating the failure of the editing operation as an editing result corresponding to the editing operation and giving a feedback. In this embodiment, since no matching area is present, if the user's editing operation is performed and the result is fed back in this case, the content that the user sees will have overlaps. Therefore, a user prompt can be generated to inform the user that the editing operation is failed, and then the user can perform another editing operation. Here, the feedback may be implemented by way of displaying the user prompt on the editing interface.

According to an embodiment of the present disclosure, when the adjustment result is not processed for anti-overlap and the user's editing operation is not performed, by generating and feeding back the user prompt indicating the failure of the editing operation, the user can be made aware that the input editing operation is inappropriate and the final result obtained is not suitable for printing, thus avoiding waste of resources.

After step 103, the user can see the corresponding content on the editing interface. Assuming that the content object that the user sees is the content subjected to the anti-overlap processing through the matching area, the user can further confirm the content object in this case. After it is confirmed without errors, operations such as saving or printing may be performed. For a handheld printer, after receiving an operation instruction initiated by the user, the user's operation instruction is executed to fulfill the printing function of the handheld printer.

For better understanding of the information processing method according to the embodiment of the present disclosure, the method will be further described below in conjunction with specific examples. In the following examples, it is assumed that the target direction includes an X direction and a Y direction, and the content objects are character strings.

Figure 19:
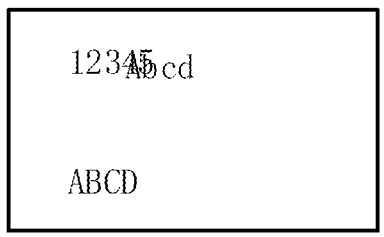
FIG. 19 is a first example diagram of content objects overlapping in an X direction according to an embodiment of the present disclosure.
Figure 20:
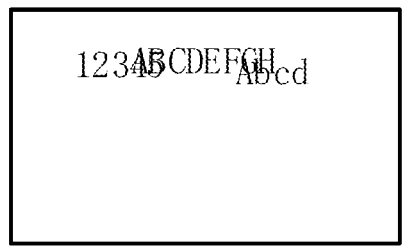
FIG. 20 is a second example diagram of content objects overlapping in the X direction according to an embodiment of the present disclosure.

Reference may be made to FIG. 19 and FIG. 20 which are example diagrams of content objects overlapping in the X direction according to embodiments of the present disclosure. In FIG. 19, character strings "12345" and "Abcd" overlap in the X direction. In FIG. 20, character strings "12345", "Abcd" and "ABCDEFGH" overlap in the X direction.

Figure 21:
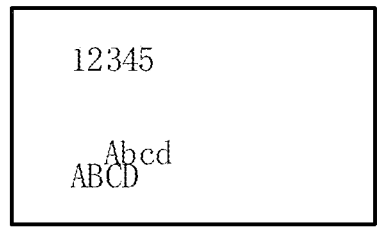
FIG. 21 is a first example diagram of content objects overlapping in a Y direction according to an embodiment of the present disclosure.
Figure 22:
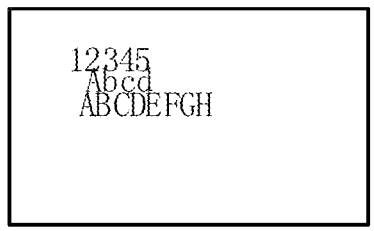
FIG. 22 is a second example diagram of content objects overlapping in the Y direction according to an embodiment of the present disclosure.

Reference may be made to FIG. 21 and FIG. 22 which are example diagrams of content objects overlapping in the Y direction according to embodiments of the present disclosure. In FIG. 21, character strings "Abcd" and "ABCD" overlap in the Y direction. In FIG. 22, character strings "12345", "Abcd" and "ABCDEFGH" overlap in the Y direction.

Figure 23:
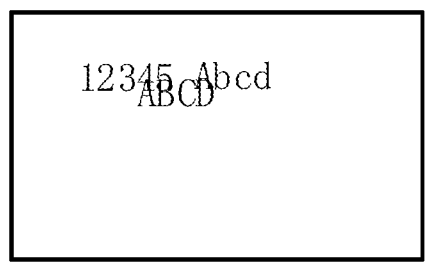
FIG. 23 is an example diagram of content objects overlapping in both the X direction and the Y direction according to an embodiment of the present disclosure.

Reference may be made to FIG. 23 which is an example diagram of content objects overlapping in both the X direction and the Y direction according to an embodiment of the present disclosure. In FIG. 23, character strings "12345", "Abcd" and "ABCD" have overlaps in both the X direction and Y direction.

Figure 24:
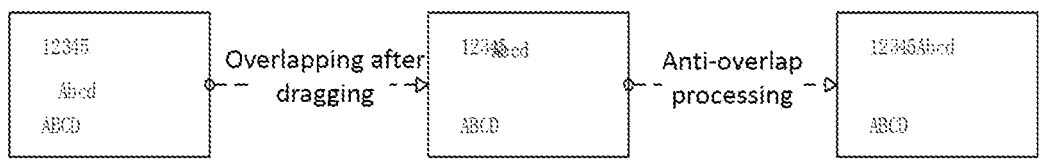
FIG. 24 is an example diagram of a first anti-overlap processing according to an embodiment of the present disclosure.

Then, reference may be made to FIG. 24 which is an example diagram of a first anti-overlap processing according to an embodiment of the present disclosure. In FIG. 24, it is assumed that three character strings input by the user are "12345", "Abcd" and "ABCD", and the corresponding editing operation is to move the character string "Abcd" to the back of the character string "12345". In this case, if the user's moving operation is performed, the character string "12345" and the character string "Abcd" will have overlaps. Through the anti-overlap processing, the character string "Abcd" can be moved to an appropriate position after the character string "12345" to form a new character string "12345Abcd".

Figure 25:
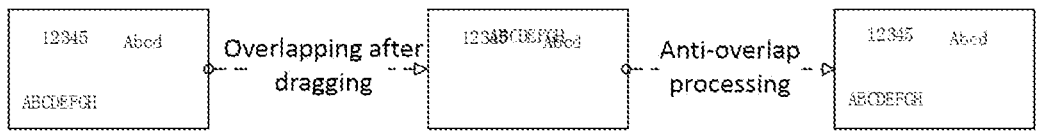
FIG. 25 is an example diagram of a second anti-overlap processing according to an embodiment of the present disclosure.

Next, reference may be made to FIG. 25 which is an example diagram of a second anti-overlap processing according to an embodiment of the present disclosure. In FIG. 25, it is assumed that three character strings input by the users are "12345", "Abcd" and "ABCDEFGH", and the editing operation is to move the character string "ABCDEFGH" to the back of the character string "12345". After being moved, the character string "ABCDEFGH" will overlap with the character string "12345" in the X direction and with the character string "Abcd" in the Y direction and this kind of overlap is inevitable, which means no matching area. So in this case, the user's editing operation will not be performed and a prompt indicating the failure of the editing operation is given, and then the character string "ABCDEFGH" returns to its initial position on the editing interface.

Figure 26:
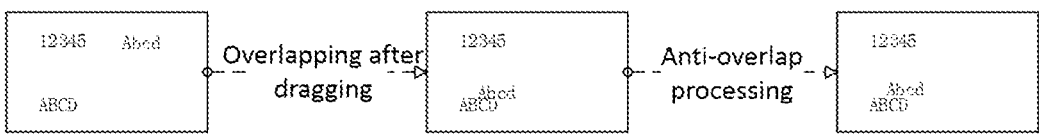
FIG. 26 is an example diagram of a third anti-overlap processing according to an embodiment of the present disclosure.

Next, reference may be made to FIG. 26 which is an example diagram of a third anti-overlap processing according to an embodiment of the present disclosure. In FIG. 26, it is assumed that three character strings input by the user are "12345", "Abcd" and "ABCD", and the corresponding editing operation is to move the character string "Abcd" to the bottom of the character string "12345" and the top of the character string "ABCD". In this case, if the user's moving operation is performed, the character string "ABCD" and the character string "Abcd" have overlaps. Through the anti-overlap processing, the character string "Abcd" can be moved to a suitable position above the character string "ABCD", and the final display result has no overlapped content.

Figure 27:
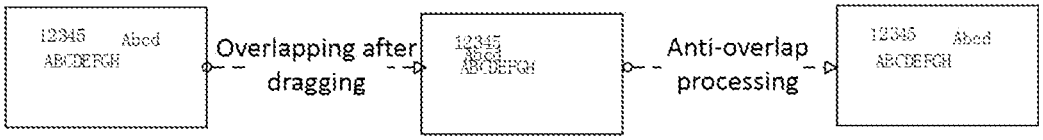
FIG. 27 is an example diagram of a fourth anti-overlap processing according to an embodiment of the present disclosure.

Next, reference may be made to FIG. 27 which is an example diagram of a fourth anti-overlap processing according to an embodiment of the present disclosure. In FIG. 27, it is assumed that three character strings input by the user are "12345", "Abcd" and "ABCDEFGH", and the editing operation is to move the character string "Abcd" to the bottom of the character string "12345". After being moved, the character string "Abcd" will overlap with the character string "12345" and the character string "ABCDEFGH" in the Y direction and this kind of overlap is inevitable, which means no matching area. In this case, the user's editing operation is not performed and a prompt indicating the failure of the editing operation is given, and then the character string "Abcd" returns to its initial position on the editing interface.

It can be seen from the above examples that the information processing methods according to the embodiments of the present disclosure can avoid the generation of overlap to a certain extent, thereby reducing the difficulty of editing by the user, ensuring a good user experience on the UI operation interface, and improving editing efficiency.

Figure 28:
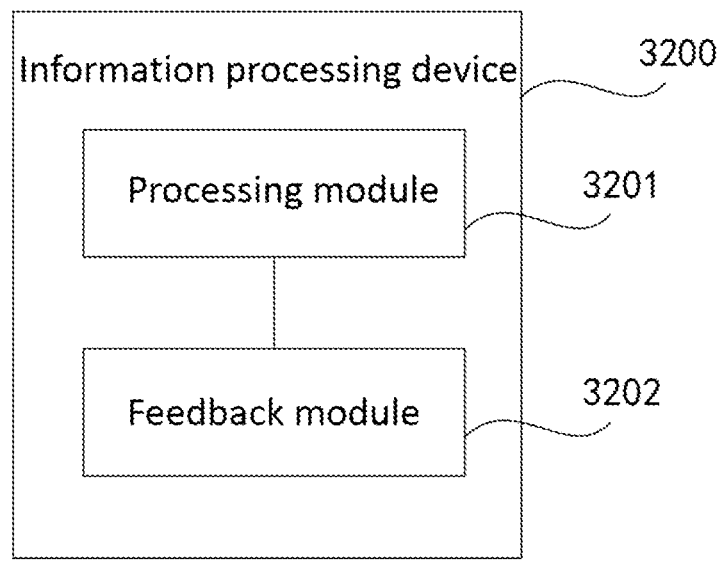
FIG. 28 is a structural block diagram of functional modules of an information processing device according to an embodiment of the present disclosure.

Based on the same inventive concept, this embodiment further provides an information processing device. Reference is made to FIG. 28 which is a schematic structural diagram of an information processing device 3200 according to this embodiment, including: a processing module 3201 and a feedback module 3202.

The processing module 3201 is configured to: when receiving multiple content objects and an editing operation corresponding to the multiple content objects input by a user on an editing interface, determine whether the editing operation causes the multiple content objects to overlap on the editing interface; and if the editing operation causes the multiple content objects to overlap on the editing interface, adjust positions of the multiple content objects on the editing interface according to the editing operation to obtain a corresponding adjustment result. The feedback module 3202 is configured to feed back an editing result corresponding to the editing operation according to the adjustment result.

Optionally, the processing module 3201 is specifically configured to: determine, according to the editing operation, whether areas occupied by the multiple content objects on the editing interface have overlaps after the editing operation; and if areas occupied by the multiple content objects on the editing interface have overlaps after the editing operation, determine that the editing operation will cause the multiple content objects to overlap on the editing interface.

Optionally, the processing module 3201 is specifically further configured to: if the editing operation is to move the first content object to a target direction of the second content object, determine whether there is an unoccupied matching area in the target direction which does not overlap with the area where the second content object is located and which can accommodate the first content object; and if there is the matching area in the target direction, move the first content object to the matching area to obtain the adjustment result. Optionally, the feedback module 3202 is specifically configured to: display the adjustment result on the editing interface.

Optionally, the processing module 3201 is specifically further configured to: if there is no matching area in the target direction, obtain the adjustment result without moving the first content object.

Optionally, the feedback module 3202 is further specifically configured to: generate and feedback a user prompt for indicating the failure of the editing operation as the editing result corresponding to the editing operation. Based on the same inventive concept, an embodiment of the present disclosure further provides a handheld printer, including a processor and a display. The processor can be an integrated circuit chip with a signal processing capability. It can be a general-purpose processor, including a CPU (Central Processing Unit), an NP (Network Processor) and the like. It can also be a digital signal processor, an application-specific integrated circuit, a field-programmable gate array or other programmable logic devices, a discrete gate or a transistor logic device, or a discrete hardware component. It can implement or execute the methods, steps, and logical block diagrams disclosed in the embodiments of the present disclosure. The general-purpose processor may be a microprocessor or the processor may also be any conventional processor or the like.

The processor is configured to: after receiving multiple content objects and an editing operation corresponding to the multiple content objects input by a user on an editing interface, determine whether the editing operation causes the multiple content objects to overlap on the editing interface; and if the editing operation causes the multiple content objects to overlap on the editing interface, adjust positions of the multiple content objects on the editing interface according to the editing operation to obtain a corresponding adjustment result. The display is configured to feed back an editing result corresponding to the editing operation according to the adjustment result.

Optionally, the processor is specifically configured to: determine, according to the editing operation, whether areas occupied by the multiple content objects on the editing interface have overlaps after the editing operation; and if areas occupied by the multiple content objects on the editing interface have overlaps after the editing operation, determine that the editing operation will cause the multiple content objects to overlap on the editing interface.

Optionally, the processor is specifically further configured to: if the editing operation is to move the first content object to a target direction of the second content object, determine whether there is an unoccupied matching area in the target direction which does not overlap with the area where the second content object is located and which can accommodate the first content object; and if there is the matching area in the target direction, move the first content object to the matching area to obtain the adjustment result.

Optionally, the display is specifically configured to: display the adjustment result on the editing interface.

Optionally, the processor is specifically further configured to: if there is no matching area in the target direction, obtain the adjustment result without moving the first content object.

Optionally, the display is further specifically configured to: generate and feedback a user prompt for indicating the failure of the editing operation as the editing result corresponding to the editing operation.

The various implementations and specific examples of the information processing method according to the foregoing embodiment are also applicable to various modules in the information processing device 3200 and various hardware modules in a handheld printer. Through the foregoing detailed description of the information processing method, those skilled in the art can clearly know the implementation of each module/hardware module, so for the sake of brevity of the description, it will not be described in detail here.

Based on the same inventive concept, this embodiment further provides a readable storage medium, the computer readable storage medium having a computer program stored thereon, and the computer program executes the information processing method described in any one of the above embodiments when the computer program is operated by a computer.

Subsequent to the information processing method described above, this embodiment further provides another printing method, involving continuous printing. As an example, the printing method can be applied to the handheld printer 10 described above and is similar to the previous printing method. In other words, compared with the above-described information processing method that improves the input of the handheld printer 10, the printing method to be described below is an improvement for the output (i.e., the printing process) of the handheld printer 10, which will be detailed in the following description.

Figure 29:
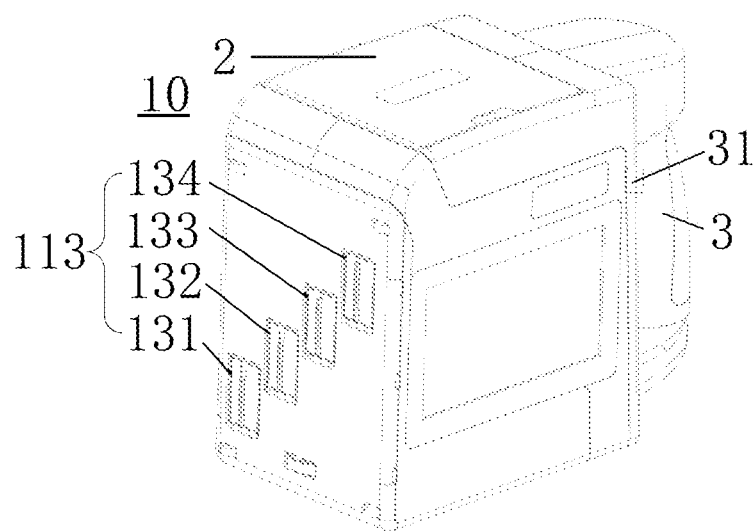
FIG. 29 is a schematic structural diagram of yet another isometric view of an assembly drawing of a handheld printer according to an embodiment of the present disclosure.

For ease of description, reference is made to FIG. 29 which is a schematic diagram of an isometric view of an assembly drawing of a handheld printer according to an embodiment of the present disclosure. Based on FIG. 29, it is reiterated here that, in this embodiment, the handheld printer may include a printer body 2, a handle 3, an inkjet printing part 113 and a printing button 31, wherein the inkjet printing part 113 is a general name of the nozzles mentioned in the above description.

Exemplarily, the printer body 2 may include a controller (i.e., the electronic control module 26 and the nozzle drive modules), and the controller is provided therein with a control program for implementing the printing method provided by the embodiment. The controller may include a single-chip microcomputer, a microprocessor, and the like, which has been mentioned in the above description and will not be repeated here. In addition, the handle 3 may be provided at the rear of the printer body 2.

Still based on the above description, in this embodiment, the inkjet printing part 113 including four nozzles (i.e., the fourth nozzle 134, the third nozzle 133, the second nozzle 132, and the first nozzle 131) is described as an example, but it should not be regarded as limiting the present disclosure. In addition, the staggered arrangement of the fourth nozzle 134, the third nozzle 133, the second nozzle 132, and the first nozzle 131 in this embodiment is described only as an example. In other possible implementations, the multiple nozzles can be arranged side by side or arranged in an array or the like, which is not limited here. Each nozzle can be responsible for printing of one area, so that the multiple nozzles can cooperate to complete the printing of a larger area and/or implement printing more efficiently.

It is still to be reiterated here that the printing button 31 can be arranged on the handle 3 so that the user can press the button while holding the handle. Certainly, this arrangement should not be regarded as limiting the present disclosure. The printing button 31 can be connected to the controller to generate an electrical signal in response to a user operation, and transmit the electrical signal to the controller so that the controller generates an instruction (including but not limited to a continuous printing instruction) based on the electrical signal to achieve the user control over the handheld printer.

According to this embodiment, the handheld printer 10 or the controller therein can serve as the execution subject of the printing method of the embodiment of the present disclosure. In this embodiment, the printing method of the embodiment of the present disclosure is described by taking the controller as the execution subject, which is not limited thereto. The detailed process of executing the printing method will be specifically described below.

Figure 30:
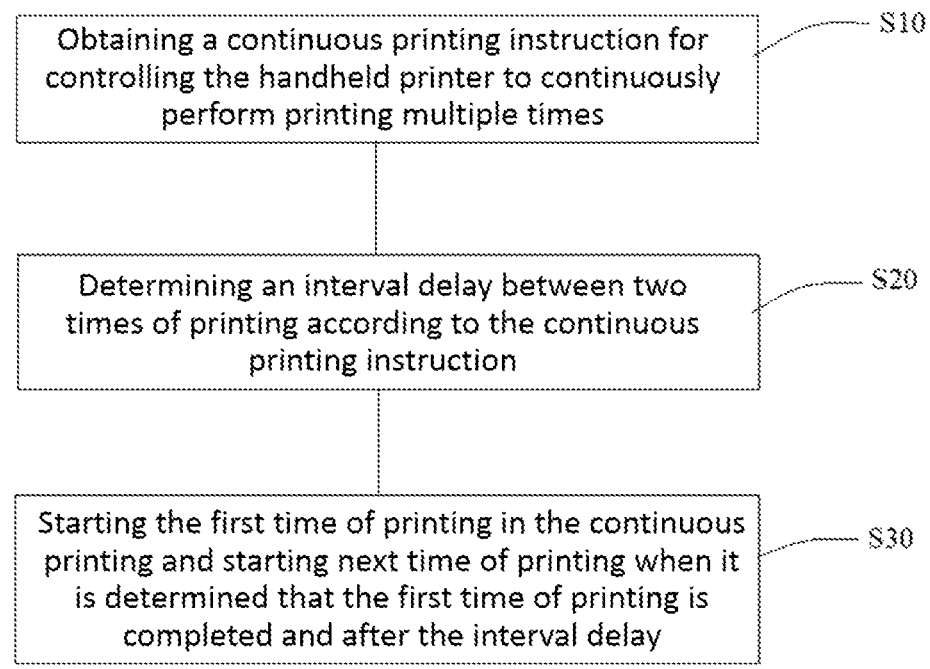
FIG. 30 is a flowchart of another printing method according to an embodiment of the present disclosure.

Reference is made to FIG. 30 which is a flowchart of a printing method according to an embodiment of the present disclosure. In this embodiment, the printing method may include step S10, step S20, and step S30.

When a user needs to use the printer for continuous printing, the user may operate the printing button 31, and the printing button 31 can generate an electrical signal in response to the user's operation and transmit the electrical signal to the controller. In this case, the controller may execute step S10.

In step S10, a continuous printing instruction for controlling the handheld printer 10 to continuously perform printing multiple times is obtained.

According to this embodiment, based on the electrical signal, the controller can generate a continuous printing instruction for controlling the handheld printer 10 to continuously perform printing multiple times. Certainly, when the method is applied to some handheld printers with more complex functions, the way to generate a control instruction may require the user to operate the printing button multiple times, and based on the operation, the controller makes a response by, for example, displaying on a display screen of a handheld printer with the display screen, giving a voice prompt, or the like, to generate a continuous printing instruction, which will not be defined here.

In order to improve the printing quality, after the controller obtains the continuous printing instruction and before execution of step S20, the inkjet printing part may be adjusted by printing a test content.

Exemplarily, taking the inkjet printing part 113 including multiple nozzles as an example, the controller may control the multiple nozzles of the inkjet printing part 113 to cooperate to print a test content and obtain the printed content. When the difference between the printed content and the test content exceeds a preset value, a corresponding adjustment delay is determined to adjust an inkjet printing delay corresponding to one or more of the multiple nozzles. In a case where each nozzle corresponds to an inkjet printing delay, the inkjet printing delay means that, when the handheld printer 10 (the controller) starts printing (it can be the first print or subsequent print), the corresponding nozzle will start inkjet printing (such as inkjet, pigments, paint, etc., which is not limited here) after an time interval corresponding to the inkjet printing delay. The inkjet printing delay corresponding to each nozzle may vary with the content (i.e., an inkjet printing portion) jet-printed by the nozzle during the printing process, which is not limited here.

Exemplarily, taking the four-nozzle handheld printer 10 of this embodiment as an example, the specific method for determining the adjustment delay will be described. Based on the test content, the controller can determine a test inkjet printing portion and a test inkjet printing delay corresponding to each nozzle in the printing of this test content. That is, the first nozzle 131 corresponds to a first test inkjet printing portion and a first test inkjet printing delay, the second nozzle 132 corresponds to a second test inkjet printing portion and a second test inkjet printing delay, the third nozzle 133 corresponds to a third test inkjet printing portion and a third test inkjet printing delay, and the fourth nozzle 134 corresponds to a fourth test inkjet printing portion and a fourth test inkjet printing delay. The controller can control each nozzle to perform this test printing based on its corresponding test inkjet printing portion and test inkjet printing delay.

Then, the controller can obtain the content of the test printing (i.e., the content printed according to the test content), and determine the difference between the printed content and the test content. Specifically, the controller can determine an area where the difference between the printed content and the test content is located. For example, the first test inkjet printing portion corresponding to the first nozzle 131 is defined as a first area, the second test inkjet printing portion corresponding to the second nozzle 132 is defined as a second area, the third test inkjet printing portion corresponding to the third nozzle 133 is defined as a third area, and the fourth test inkjet printing portion corresponding to the fourth nozzle 134 is defined as a fourth area. In this embodiment, the first area can be used as a reference, and all the areas can be seamlessly connected (certainly, it also can be determined according to actual needs that the areas are connected with seams therebetween or they have overlaps, and this will not be limited here). In this way, in which area the difference between the printed content and the test content is located can be determined. For example, if the difference is in the second area and there is no deviation in both the third area and the fourth area, it can be determined that the adjustment delay corresponding to the second nozzle 132 can be determined based on a specific difference amount in combination with a movement rate for inkjet printing. The adjustment method here is only exemplary and should not be regarded as limiting the present disclosure. In addition, from FIG. 29, it can be seen that the printing process described above refers to a printing process from left to right. However, the printing process is not limited to this, and it can also be a printing process of a handheld printer which performs printing from right to left. In this printing process, it is obvious that its printing direction is opposite to the printing direction (from left to right) of the printing process described above; that is, the first test inkjet printing portion corresponding to the first nozzle 131 is still defined as a first area, the second test inkjet printing portion corresponding to the second nozzle 132 is still defined as a second area, the third test inkjet printing portion corresponding to the third nozzle 133 is still defined as a third area, and the fourth test inkjet printing portion corresponding to the fourth nozzle 134 is still defined as a fourth area. However, in the process of printing from right to left, the fourth area is used as the reference. By determining the area where the difference between the printed content and the test content is located, a differential inkjet printing portion is further determined, and then the corresponding adjustment delay can be determined according to the differential inkjet printing portion. In this way, the inkjet printing delay of each nozzle can be adjusted accurately, which is beneficial to improving the printing quality.

The determined adjustment delay can be used to adjust the inkjet printing delay of the corresponding nozzle. The adjustment method can be one-time adjustment (i.e., the determined method changing the inkjet printing delay). It can also be adjustment each time; that is, the inkjet printing delay of the nozzle determined each time in combination with the adjustment delay is take an effect together on the printing process. This will not be specifically limited here.

After obtaining the continuous printing instruction (or after determining the adjustment delay), the controller may execute step S20.

In step S20, an interval delay between two times of printing is determined according to the continuous printing instruction.

In this embodiment, the controller can determine the interval delay included in the continuous printing instruction, wherein the interval delay represents a time duration between two times of printing during the continuous printing process. Exemplarily, the interval delay may be preset, or set or adjusted by the user, which is not limited here. As a buffer between two times of printing, the interval delay can be determined according to actual needs (for example, the print content is relatively complicated, or paper, fabric or the like for printing needs to be replaced), so that continuous printing can better meet the needs of the user.

In addition, in this embodiment, the continuous printing instruction may also include the number of times of printing in the continuous printing process, and the controller can determine the number of times of printing in the continuous printing instruction. Exemplarily, the number of times of printing may be set by the user, or may be preset or acquired, which is not limited here. By setting the number of times of printing, the number of times of printing in continuous printing can be quantified. In this way, the continuous printing becomes more flexible and controllable, which brings convenience for users.

After determining the interval delay (or determining the interval delay and the number of times of printing), in order to reserve some buffer time for the user, the controller may also determine a start delay before executing step S30. The start delay may represent a time delay before start of the first time of printing in the continuous printing process. For example, it may be a time duration of the interval between obtaining control instruction and the first time of printing, or after the controller is ready for the first time of printing (for example, having determined the interval delay, the number of times of printing, the printing content, etc.), the first time of printing is started after the interval of the start delay.

In this embodiment, the process of determining the content of the first time of printing may be performed at any time during the process before starting the first time of printing and after the controller receives the continuous printing instruction. In order to achieve continuous printing of variable content (that is, the printing contents of the two times of printing in the continuous printing process may be different), the content of each time of printing may be determined before starting the first time of printing in the continuous printing, or before each time of printing is performed in the continuous printing process, the content required to be printed in this time of printing may be determined. This will not be limited here. In this embodiment, the case where the content of each time of printing is determined before this time of printing is performed is described as an example, but it should not be regarded as limiting the present disclosure.

By determining the start delay, some buffer time is reserved for the user to confirm the preparation work. When a temporary stop is required, the stop can be implemented in time during the start delay with zero loss, and the user can avoid a last-minute panic as much as possible Regarding the determination of the printing content, the determination of the content of the first time of printing is described here as an example. Exemplarily, the controller may obtain the content of the first time of printing, and determine the inkjet printing portion of each nozzle and the inkjet printing delay of each nozzle according to the content of the first time of printing.

After the time duration corresponding to the printing delay, the controller may execute step S30.

In step S30, the first time of printing in the continuous printing is started, and the next time of printing is started when it is determined that the first time of printing is completed and after the interval delay.

In this embodiment, according to the inkjet printing portion and inkjet printing delay of each nozzle (and also according to an adjustment delay for adjustment in each time of printing if any), the controller can control the corresponding nozzle to perform inkjet printing to complete the current time of printing (first time of printing).

Exemplarily, an example where the first time of printing is performed by the four-nozzle handheld printer 10 of this embodiment is described here. After starting the first time of printing and after a corresponding first inkjet printing delay, the controller may control the first nozzle 131 to print the content of a first inkjet printing portion; and/or, after a corresponding second inkjet printing delay, the controller may control the second nozzle 132 to print the content of a second inkjet printing portion; and/or, after a corresponding third inkjet printing delay, the controller can control the third nozzle 133 to print the content of a third inkjet printing portion; and/or, after a corresponding fourth inkjet printing delay, the controller may control the fourth nozzle 134 to print the content of a fourth inkjet printing portion. In this way, the first time of printing can be completed.

After the first time of printing is completed, the controller can record the number of time of printing completed as 1. Correspondingly, every time a time of printing is completed, the number of times of printing completed can be increased by one. When the number of times of printing completed on the controller is the same as the number of times of printing required in this continuous printing process (i.e., the number of times of printing), the controller can stop continuous printing, thereby completing the task of this continuous printing.

By applying the continuous printing method to a multi-nozzle handheld printer, printing efficiency can be improved on the one hand, and on the other hand, larger images can be continuously printed through multiple nozzles. In combination with the inkjet printing portion and the inkjet printing delay corresponding to each nozzle, the continuous printing can be implemented.

Certainly, if it is required to stop continuous printing, the user can do so by operating a handheld printer, for example, pressing the printing button 31 twice in succession (this operation is only exemplary and should not be regarded as limiting the present disclosure). In this way, continuous printing can be stopped conveniently and quickly. Therefore, the continuous printing of the handheld printer can be controlled more simply, which brings convenience for users.

Figure 31:
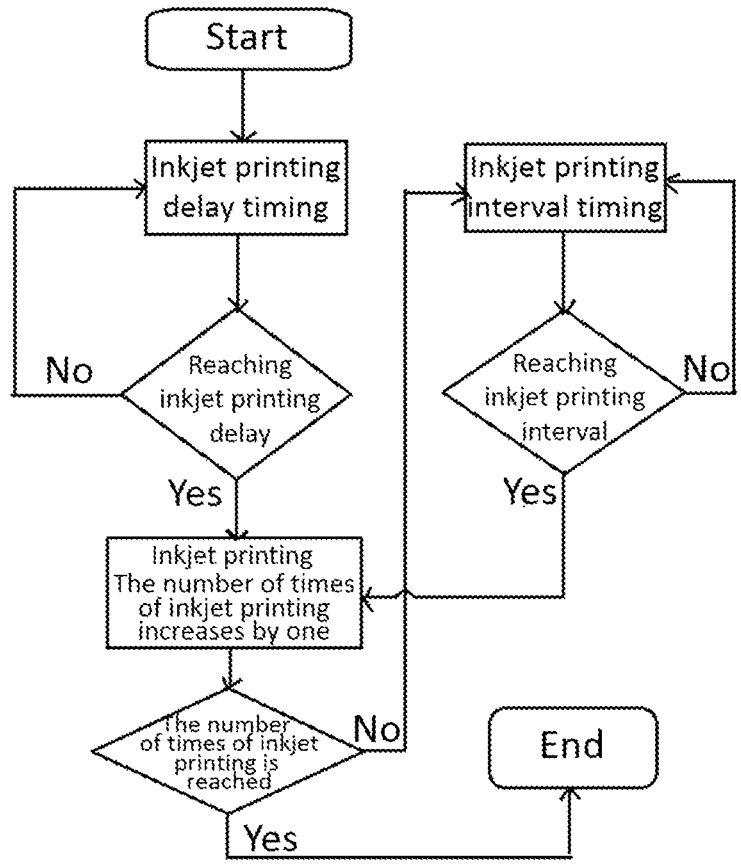
FIG. 31 is a control flowchart of continuous printing of a handheld printer according to an embodiment of the present disclosure.

The above is a description of the operation process of the continuous printing method according to the present disclosure. A control process for a handheld printer to implement continuous printing is further provided here. Reference is made to FIG. 31 which is a control flowchart of continuous printing of a handheld printer according to an embodiment of the present disclosure.

First, the continuous printing starts and then inkjet printing delay timing starts (i.e., the start delay). After the time of inkjet printing delay (i.e., start delay) is up, the first time of printing content will start. After the printing is completed, the number of times of inkjet printing will increase by one. The number of times of inkjet printing is determined (that is, whether the number of times of printing completed reaches the number of times of printing of continuous printing is determined). If the number of times of inkjet printing reaches the number of times of printing of continuous printing (that is, the number of times of printing completed is the same as the number of times of printing of continuous printing), the printing ends. If the number of times of inkjet printing does not reach the number of times of printing of continuous printing (that is, the number of times of printing completed does not reach the number times of printing of continuous printing), the inkjet printing interval timing (i.e., the interval delay) starts. Whether the time of inkjet printing interval is reached is determined. If the inkjet printing interval is reached (i.e., reaching the time duration corresponding to the interval delay), the next time of inkjet printing starts, and after the inkjet printing is completed, the number of times of inkjet printing increases by one and then the number of times of inkjet printing is determined again. If not reaching, timing is continued and the determination of the inkjet printing interval is performed until the inkjet printing interval is reached, and then the next time of inkjet printing starts.

Certainly, this control process is only an exemplary control method, and should not be regarded as limiting the present disclosure. There are various control methods and control processes in actual applications, and actual needs shall prevail.

Figure 32:
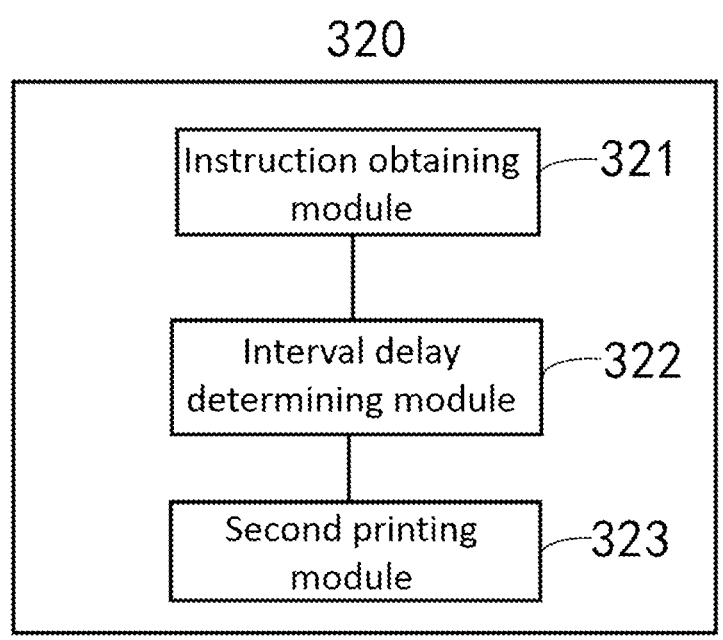
FIG. 32 is a structural block diagram of a second printing device according to an embodiment of the present disclosure.

Reference is made to FIG. 32. Based on the same inventive concept, an embodiment of the present disclosure further provides a printing device. In order to distinguish it from the above-mentioned first printing device 200, the printing device shown in FIG. 32 is defined as "second printing device 320", and the second printing device 320 is applied to the handheld printer 10 and includes: an instruction obtaining module 321, configured to obtain a continuous printing instruction for controlling the handheld printer 10 to continuously perform printing multiple times; an interval delay determining module 322, configured to determine an interval delay between two times of printing according to the continuous printing instruction; and a second printing module 323, configured to start a first time of printing in the continuous printing and to start next time of printing after determining that the first time of printing is completed and the interval delay is reached.

In this embodiment, the second printing device 320 further includes: a start delay module, configured to determine a start delay before a second printing module 323 starts the first time of printing in the continuous printing; and the second printing module 323 is configured to start the first time of printing in the continuous printing after the instruction obtaining module 321 obtains the continuous printing instruction and the start delay is reached.

In this embodiment, the second printing device 320 further includes: a number-of-time-of-printing module, configured to: determine the number of times of printing according to the continuous printing instruction after the instruction obtaining module 321 obtains the continuous printing instruction for controlling the handheld printer 10 to continuously perform printing multiple times; and end the continuous printing when determining that the number of times of printing completed is the same as the number of times of printing.

In this embodiment, the handheld printer includes a plurality of nozzles, and the second printing device 320 further includes: a printing content determining module, configured to: obtain a content of the first time of printing before the second printing module 323 starts the first time of printing in the continuous printing; and determine an inkjet printing portion of each nozzle and an inkjet printing delay of each nozzle according to the content of the first time of printing; correspondingly, the second printing module 323 is configured to control each nozzle to perform inkjet printing according to the inkjet printing portion and the inkjet printing delay of each nozzle.

In this embodiment, the handheld printer 10 includes a first nozzle 131, a second nozzle 132, a third nozzle 133, and a fourth nozzle 134. The second printing module 323 is further configured to control the first nozzle to print a first inkjet printing portion corresponding to the first nozzle 131 after a first inkjet printing delay corresponding to the first nozzle 131; and/or, to control the second nozzle 132 to print a second inkjet printing portion corresponding to the second nozzle 132 after a second inkjet printing delay corresponding to the second nozzle 132; and/or, to control the third nozzle 133 to print a third inkjet printing portion corresponding to the third nozzle 133 after a third inkjet printing delay corresponding to the third nozzle 133; and/or, to control the fourth nozzle 134 to print a fourth inkjet printing portion corresponding to the fourth nozzle 134 after a fourth inkjet printing delay corresponding to the fourth nozzle 134.

For example, the second printing module 323 is configured to control the first nozzle 131 to print the first inkjet printing portion corresponding to the first nozzle 131 after the first inkjet printing delay corresponding to the first nozzle 131; and to control the second nozzle 132 to print the second inkjet printing portion corresponding to the second nozzle 132 after the second inkjet printing delay corresponding to the second nozzle 132; and to control the third nozzle 133 to print the third inkjet printing portion corresponding to the third nozzle 133 after the third inkjet printing delay corresponding to the third nozzle 133; and to control the fourth nozzle 134 to print the fourth inkjet printing portion corresponding to the fourth nozzle 134 after the fourth inkjet printing delay corresponding to the fourth nozzle 134. For the printing mode of the second printing module 323, reference may be made to the left-to-right printing mode (based on the first inkjet printing portion) and the right-to-left printing mode (based on the fourth inkjet printing portion) mentioned in the above description. It will not be detailed here.

In this embodiment, the second printing device 320 further includes: a test module, configured to control the multiple nozzles to cooperate to print a test content before the printing content determining module obtains the content of the first time of printing; and to determine a corresponding adjustment delay to adjust the inkjet printing delay corresponding to one or more of the multiple nozzles when a difference between the printed content and the test content exceeds a preset value.

In this embodiment, the test module is further configured to determine an area where the difference between the printed content and the test content is located; to determine a differential inkjet printing portion corresponding to the area based on the area; and to determine the corresponding adjustment delay according to the differential inkjet printing portion.

An embodiment of the present disclosure further provides a storage medium, having one or more programs stored thereon, and the one or more programs can be executed by one or more processors to implement the steps of the printing method as described in this embodiment.

In summary, the above-mentioned printing method, device, storage medium and handheld printer provided in this embodiment are designed with a continuous printing method. After a continuous printing instruction is received, an interval delay between two times of printing is determined; with the interval delay as a buffer between two times of printing, the continuous printing method can be applied to the handheld printer 10. In this way, the user's workload can be reduced, work efficiency can be improved, and product quality problems caused by user fatigue can also be avoided as much as possible. In addition, the service life of vulnerable parts (e.g., the printing button 31) of the handheld printer 10 can also be extended effectively.

The above are only specific embodiments of the present disclosure, but the protection scope of the present disclosure is not limited to this. Any changes or substitutions reached easily by those skilled in the art within the technical scope disclosed in the present disclosure shall fall within the protective scope of the present disclosure. Therefore, the protective scope of the present disclosure should be defined by the protective scope of the appended claims.

INDUSTRIAL APPLICABILITY

Since the nozzles and the handle are arranged at the two opposite ends of the printer body, the handheld printer has compact structure, small size, and light weight and is easy to carry; during operation, the set position of the handle makes it easier to operate and print and the quality of printed products can be improved; the stepped setting of the nozzles helps to increase the height of printed texts, two-dimensional codes and graphics, thereby improving the printing efficiency and achieving strong adaptability.

The printing order of the nozzles is determined according to the preset printing origin and the position offset of each nozzle determined based on the printing origin. Then, the nozzle firstly used for printing is controlled to start printing its printing content from the initial printing position, and other nozzles are controlled to print their respective corresponding printing contents after reaching the initial printing position. In this way, it can be finally ensured that a complete image can be formed by combination through multiple nozzles at the same printing position, thus improving the accuracy and completeness of printing large-breadth images through multiple nozzles.

The information processing method can avoid the generation of overlap to a certain extent, thereby reducing the difficulty of editing by the user, ensuring a good user experience on the UI operation interface, and improving editing efficiency.

By designing the continuous printing method, after a continuous printing instruction is received, an interval delay between two times of printing is determined; with the interval delay as a buffer between two times of printing, the continuous printing method can be applied to the handheld printer. In this way, the user's workload can be reduced, work efficiency can be improved, and product quality problems caused by user fatigue can also be avoided as much as possible. In addition, the service life of vulnerable parts (e.g., the printing button) of the handheld printer can also be extended effectively.

What is claimed is:

1. A handheld printer, comprising;
    a printer body, a protective nozzle cover and a handle, wherein the protective nozzle cover and the handle are arranged at two opposite ends of the printer body;
    the printer body comprises a printing panel, the printing panel is located at an inner side of the protective nozzle cover; the printing panel is provided with at least two nozzles, the at least two nozzles are sequentially arranged along a first preset direction and a second preset direction and spaced apart from each other, the first preset direction is a vertical direction, an included angle is formed between the second preset direction and the first preset direction;
    the printer body comprises a top cover, a left side cover, a right side cover, and an electronic control module; two sides of the printing panel are respectively connected with the left side cover and the right side cover to form an upward opening; the top cover is movably connected with the right side cover so that the electronic control module is in an on-or-off state when the opening is opened or closed;
    the printer body further comprises a touch screen, the touch screen is fixed on the left side cover, the electronic control module is fixed on an inner side of the left side cover, the touch screen and the electronic control module are electrically connected;
    the printer body further comprises an upper cover, an ink cartridge support module, and ink cartridges, the upper cover is arranged at the opening, two opposite sides of the upper cover are connected to the left side cover and the right side cover, respectively;
    the ink cartridge support module is arranged below the upper cover, the ink cartridges are installed between the upper cover and the ink cartridge support module; and
    the ink cartridge support module comprises a plurality of ink cartridge locking plates, the plurality of ink cartridge locking plates are arranged sequentially in a direction from the left side cover to the right side cover and spaced apart from each other, a locking groove for installing an ink cartridge is formed between every two adjacent ink cartridge locking plates, all of locking grooves are arranged sequentially along the first preset direction and the second preset direction and spaced apart from each other, and the upper cover is connected to tops of the plurality of ink cartridge locking plates.

2. The handheld printer according to claim 1, wherein the printer body further comprises nozzle drive modules, the nozzle drive modules are electrically connected to the electronic control module; the nozzle drive modules are arranged under and electrically connected to the ink cartridges; and the nozzle drive modules drive the ink cartridges to work under control by the electronic control module; and
    the printer body further comprises a battery and a battery hood,
    wherein the battery is arranged in the battery hood and electrically connected to the electronic control module, and the battery hood is connected to one side of the ink cartridge support module.

3. The handheld printer according to claim 1, wherein the printer body further comprises a bottom plate and a main roller structure, wherein
    the bottom plate is arranged at bottoms of the left side cover and the right side cover, the printing panel is connected to the bottom plate, and the main roller structure is arranged on the bottom plate and located at a bottom end of the printing panel; and
    the main roller structure comprises a main roller, a bearing and a mounting shaft,
    wherein the mounting shaft is fixed on the bottom plate, and the main roller is rotatably arranged on the mounting shaft through the bearing.

4. The handheld printer according to claim 1, wherein the handle comprises a left plate, a right plate and a printing button,
    wherein the left plate and the right plate are symmetrically arranged on and snapped to the left side cover and the right side cover; and a groove is formed at a junction of the left plate and the right plate, and the printing button is installed in the groove.

* * * * *